(12) United States Patent
Petunin et al.

(10) Patent No.: US 7,516,435 B2
(45) Date of Patent: Apr. 7, 2009

(54) RESERVATION OF DESIGN ELEMENTS IN A PARALLEL PRINTED CIRCUIT BOARD DESIGN ENVIRONMENT

(75) Inventors: Vladimir V. Petunin, Longmont, CO (US); Charles L. Pfeil, Louisville, CO (US); Henry Potts, Longmont, CO (US); Vladimir B. Shikalov, Longmont, CO (US)

(73) Assignee: Mentor Graphics Corporation, Wilsonville, OR (US)

( * ) Notice: Subject to any disclaimer, the term of this patent is extended or adjusted under 35 U.S.C. 154(b) by 375 days.

(21) Appl. No.: 10/870,497

(22) Filed: Jun. 18, 2004

(65) Prior Publication Data
US 2005/0044518 A1 Feb. 24, 2005

Related U.S. Application Data

(63) Continuation-in-part of application No. 10/780,902, filed on Feb. 19, 2004, which is a continuation of application No. 10/269,614, filed on Oct. 10, 2002, now Pat. No. 6,708,313.

(60) Provisional application No. 60/523,697, filed on Nov. 21, 2003, provisional application No. 60/341,037, filed on Dec. 10, 2001.

(51) Int. Cl.
*G06F 17/50* (2006.01)
*G06F 9/455* (2006.01)
*G06F 9/00* (2006.01)
*G06F 15/16* (2006.01)

(52) U.S. Cl. .......................... 716/11; 716/15; 715/751; 709/203

(58) Field of Classification Search .................... 716/11, 716/15, 751, 748; 709/203, 205
See application file for complete search history.

(56) References Cited

U.S. PATENT DOCUMENTS 5,107,443 A 4/1992 Smith (Continued)

FOREIGN PATENT DOCUMENTS

EP 0750267 6/1995

(Continued)

OTHER PUBLICATIONS

U.S. Appl. No. 60/341,037, filed Jun. 19, 2003.

(Continued)

*Primary Examiner*—Stacy A. Whitmore
*Assistant Examiner*—Magid Y. Dimyan
(74) *Attorney, Agent, or Firm*—Banner & Witcoff, Ltd.

(57) ABSTRACT

Multiple users simultaneously edit at least a portion of a printed circuit board (PCB) design. The PCB design portion is transmitted to first and second clients for graphical display at each of the clients. A first protection boundary is associated with an area of the PCB design being edited at the first client. A second protection boundary is associated with an area of the PCB design being edited at the second client. The first and second protection boundaries are displayed at each of the first and second clients. A request from one of the clients to edit an object within a region bounded by a protection boundary associated with the other client is rejected. The protection boundary may surround a user's cursor. The size of the boundary may increase based on editing activity by a user in an area of a PCB design.

58 Claims, 31 Drawing Sheets

U.S. PATENT DOCUMENTS

| | | | |
|---|---|---|---|
| 5,258,920 | A | 11/1993 | Haller et al. |
| 5,333,312 | A | 7/1994 | Wang |
| 5,333,315 | A | 7/1994 | Saether et al. |
| 5,333,316 | A | 7/1994 | Champagne et al. |
| 5,392,400 | A | 2/1995 | Berkowitz |
| 5,452,218 | A | 9/1995 | Tucker et al. |
| 5,544,067 | A | 8/1996 | Rostoker et al. |
| 5,555,388 | A | 9/1996 | Shaughnessy |
| 5,583,993 | A | 12/1996 | Foster et al. |
| 5,604,680 | A | 2/1997 | Bamji et al. |
| 5,745,747 | A | 4/1998 | Chang et al. |
| 5,806,058 | A | 9/1998 | Mori et al. |
| 5,809,240 | A | 9/1998 | Kumagai |
| 5,826,265 | A | 10/1998 | Van Huben et al. |
| 5,892,900 | A | 4/1999 | Ginter et al. |
| 5,950,201 | A | 9/1999 | Van Huben et al. |
| 5,966,707 | A | 10/1999 | Van Huben et al. |
| 5,983,277 | A | 11/1999 | Heile et al. |
| 6,023,565 | A | 2/2000 | Lawman et al. |
| 6,026,230 | A | 2/2000 | Lin et al. |
| 6,094,654 | A | 7/2000 | Van Huben et al. |
| 6,094,658 | A | 7/2000 | Araki |
| 6,110,213 | A | 8/2000 | Vinciarelli et al. |
| 6,110,223 | A * | 8/2000 | Southgate et al. ............. 716/18 |
| 6,134,705 | A | 10/2000 | Pedersen et al. |
| 6,182,115 | B1 | 1/2001 | Cuomo et al. |
| 6,289,254 | B1 | 9/2001 | Shimizu et al. |
| 6,327,594 | B1 | 12/2001 | Van Huben et al. |
| 6,356,796 | B1 | 3/2002 | Spruiell et al. |
| 6,424,959 | B1 | 7/2002 | Bennett et al. |
| 6,484,177 | B1 | 11/2002 | Van Huben et al. |
| 6,530,065 | B1 | 3/2003 | McDonald et al. |
| 6,578,174 | B2 | 6/2003 | Zizzo |
| 6,594,799 | B1 | 7/2003 | Robertson et al. |
| 6,654,747 | B1 | 11/2003 | Van Huben et al. |
| 6,671,699 | B1 | 12/2003 | Black et al. |
| 6,678,871 | B2 | 1/2004 | Takeyama et al. |
| 6,678,876 | B2 | 1/2004 | Stevens et al. |
| 6,678,877 | B1 | 1/2004 | Perry et al. |
| 6,687,710 | B1 | 2/2004 | Dey |
| 6,708,313 | B2 | 3/2004 | Pfeil et al. |
| 6,717,718 | B1 | 4/2004 | Kelsoe et al. |
| 6,721,922 | B1 | 4/2004 | Walters et al. |
| 6,751,781 | B2 | 6/2004 | Lin et al. |
| 6,782,511 | B1 | 8/2004 | Frank et al. |
| 6,851,094 | B1 | 2/2005 | Robertson et al. |
| 6,851,100 | B1 | 2/2005 | You et al. |
| 6,931,369 | B1 | 8/2005 | Perry et al. |
| 6,983,434 | B1 | 1/2006 | Frank et al. |
| 7,024,433 | B2 | 4/2006 | Arai et al. |
| 7,036,101 | B2 | 4/2006 | He et al. |
| 7,039,892 | B2 | 5/2006 | Mantey et al. |
| 7,076,491 | B2 | 7/2006 | Tsao |
| 7,103,434 | B2 | 9/2006 | Chernyak et al. |
| 7,134,096 | B2 | 11/2006 | Brathwaite et al. |
| 7,143,134 | B2 | 11/2006 | Petrie et al. |
| 7,143,341 | B1 | 11/2006 | Kohli |
| 7,219,311 | B2 | 5/2007 | Koga et al. |
| 7,240,309 | B2 | 7/2007 | Saito et al. |
| 7,246,055 | B1 | 7/2007 | Singh |
| 2002/0059054 | A1 | 5/2002 | Bade et al. |
| 2002/0069220 | A1 | 6/2002 | Tran |
| 2002/0120858 | A1 | 8/2002 | Porter et al. |
| 2002/0144212 | A1 | 10/2002 | Lev et al. |
| 2002/0188910 | A1 | 12/2002 | Zizzo |
| 2003/0009727 | A1 | 1/2003 | Takeyama et al. |
| 2003/0101425 | A1* | 5/2003 | Makinen ...................... 716/11 |
| 2003/0131332 | A1 | 7/2003 | Pfeil et al. |
| 2004/0093397 | A1 | 5/2004 | Chiroglazov et al. |
| 2004/0199891 | A1 | 10/2004 | Bentley et al. |
| 2004/0210854 | A1 | 10/2004 | Pfeil et al. |
| 2004/0225988 | A1 | 11/2004 | Petunin et al. |
| 2004/0268283 | A1 | 12/2004 | Perry et al. |
| 2005/0080502 | A1 | 4/2005 | Chernyak et al. |
| 2005/0108663 | A1 | 5/2005 | Bentley et al. |
| 2005/0114821 | A1 | 5/2005 | Petunin et al. |
| 2005/0125763 | A1 | 6/2005 | Lin et al. |
| 2005/0131783 | A1 | 6/2005 | Jin |
| 2005/0160396 | A1 | 7/2005 | Chadzynski |
| 2005/0237776 | A1 | 10/2005 | Gropper et al. |
| 2005/0246672 | A1 | 11/2005 | Bois et al. |

FOREIGN PATENT DOCUMENTS

| | | |
|---|---|---|
| JP | 02-048774 | 2/1990 |
| JP | 02-056070 | 2/1990 |
| JP | 02-245865 | 10/1990 |
| JP | 04-068470 | 3/1992 |
| JP | 04-362783 | 12/1992 |
| JP | 05-073630 | 3/1993 |
| JP | 05-74942 | 3/1993 |
| JP | 05-242174 | 9/1993 |
| JP | 06203108 | 7/1994 |
| JP | 07-175842 | 7/1995 |
| JP | 08-235233 | 9/1996 |
| JP | 09-62726 | 3/1997 |
| JP | 09-212530 | 8/1997 |
| JP | 09-288690 | 11/1997 |
| JP | 10-105586 | 4/1998 |
| JP | 10-307855 | 11/1998 |
| JP | 11-288428 | 10/1999 |
| JP | 2003-186914 | 7/2003 |
| WO | 03/050726 | 6/2003 |
| WO | 03/050751 | 6/2003 |
| WO | WO 03/050726 | 6/2003 |
| WO | 2003088095 | 10/2003 |

OTHER PUBLICATIONS

Michael K.W. Wu et al., "Development of an Integrated CAD Tool for Switching Power Supply Design with EMC Performance Evaluation," *IEEE Transactions on Industry Applications*, vol. 34, No. 2, pp. pp. 364-373, Mar.-Apr. 1998).

Geppert, L., "IC Design on the World Wide Web," IEEE Spectrum, Oct. 2001. pp. 31-36.

Numerical Receipes in C: The Art of Scientific Computing, Second Edition; Cambridge University Press (1992).

English Abstract of JP2003-186914, Jul. 4, 2003.

Machine-Generated English Translation of Portions of JP2003-186914, Jul. 4, 2003.

English Translation of Abstract and Claims of JP2003-186914, Jul. 4, 2003.

Printout of web page at <http://www.stella.co.jp/system/data.htm> and English language translation thereof; date of first publication unknown, but prior to Sep. 9, 2003; (2 pages).

Printout of web page at <http://www.stella.co.jp/system/faq.htm> and English language translation thereof; date of first publication unknown, but prior to Nov. 18, 2003; (5 pages).

Printout of web page at <http://www.stella.co.jp/system/multi.htm> and English language translation thereof; date of first publication unknown, but prior to Sep. 9, 2003; (2 pages).

Printout of web page at <http://www.stella.co.jp/system/option.htm> and English language translation thereof; date of first publication unknown, but prior to Sep. 9, 2003; (2 pages).

Printout of web page at <http://www.stella.co.jp/system/pcb_cad.htm> English language translation thereof; date of first publication unknown, but prior to Sep. 9, 2003; (2 pages).

Printout of web page at <http://www.stella.co.jp/system/print.htm> and English language translation thereof; date of first publication unknown, but prior to Sep. 9, 2003; (3 pages).

Printout of web page at <http://www.stella.co.jp/system/stella_station.htm> and English language translation thereof; date of first publication unknown, but prior to Nov. 18, 2003; (3 pages).

Printout of web page at <http://www.stella.co.jp/system/system.htm> and English language translation thereof; date of first publication unknown, but prior to Sep. 9, 2003; (2 pages).

English language translation of web page formerly available at <http://www.ydc.co.jp/cad/epsilon/productC3Design/>; date of first publication unknown, but prior to Feb. 17, 2004; (6 pages).

International Search Report of PCT/US02/39347 dated Mar. 27, 2003.

International Search Report of PCT/US02/39394 dated Jun. 19, 2003.

Horn, I et al., "Estimation of the number of routing layers and total wirelenght in a PCT through wiring distribution analysis", Design Automation Conference, 1996, Proceedings EURO-DAC'96, Sep. 16-20 1996, pp. 310-315.

Translation of an Office Action for JP2003551712 dated Aug. 21, 2006.

Translation of an Office Action for JP2003-551734 dated Aug. 21, 2006.

Hardwick, M.; et al., "Using a Relational Database as an Index to a Distributed Object Database in Engineering Design Systems", IEEE, Oct. 16, 1989, pp. 4-11.

Anupam, V., et al., "Collaborative Multimedia Scientific Design in Shastra", 1993, pp. 1-12.

Anupam V., et al., "SHASTRA: Multimedia Collaborative Design Environment," IEEE Multimedia, vol. 1, No. 2, Jun. 21, 1994, pp. 39-49.

Anupam V., et al., "SHASTRA an Architecture for Development of Collaborative Applications", Enabling Technologies: Infrstructure for Collaborative Enterprises, Apr. 20-22, 1993, pp. 155-156.

Honghai, Shen, et al., "Access Control for Collaborative Environments", Oct. 31, 1992, pp. 51-58.

N. Shyamsundat, et al., "Internet-based Collaborative Product Design with Assembly Features and Virtual Design Spaces", Jun. 5, 2001, pp. 637-651.

EP Search Report for EP02795797 dated Oct. 20, 2006.

English translation of Document titled "Exhibits and other documents" submitted Sep. 29, 2006 in Japanese Patent Application No. 2003-551734, pp. 1-5.

English Language Translation of Publication submission of Japanese Patent Application No. 2003-551734 dated Oct. 25, 2006.

English Language Translation of Japanese Kokai Patent Application No. Hei 5[1993]-242174 published Sep. 21, 1993 (filing No. Hei 4[1992]-41727).

English Language Translation of Japanese Kokai Patent Application No. Hei 11[1999]-288428, published Oct. 19, 1999 (filing No. Hei 10[1998]-91372).

English Language Translation of Japanese Kokai Patent Application No. Hei 9[1997]-288690 published Nov. 4, 1997 (filing No. Hei 8[1996]-122462).

English Language Translation of Japanese Kokai Patent Application No. Hei 2[1990]-245865, published Mar. 20, 1989 (filing No. Hei 1[1989]-65906).

English Language Translation of Japanese Public Patent Disclosure Bulletin No. 10105586, dated Apr. 24, 1998 (application 8-25457).

English Language Translation of Japanese Kokai Patent Application No. Hei 4[1992]-362783, published Dec. 15, 1992 (filing No. Hei 3[1996]-137766).

English Language Translation of Japanese Kokai Patent Application No. Hei 9[1997]-212530, published Aug. 15, 1997 (filing No. Hei 8[1996]-17325).

English Language Translation of Japanese Kokai Patent Application No. Hei 5[1993]-073630, published Mar. 6, 1993 (filing No. Hei 3[1991]-233515).

English Language Translation of Japanese Public Patent Disclosure Bulletin no. 08235233, dated Sep. 13, 1996 (application No. 7-38249).

English Language Translation of Japanese Kokai Patent Application No. Hei 2[1990]-0056070, published Aug. 20, 1988 (filing No. Sho 63[1998]-205677).

English Language Translation of Japanese Kokai Patent Application No. Hei 7[1995]-175842, published Jul. 14, 1995 (filing No. Hei 5[1993]-345183).

English Language Translation of Japanese Kokai Patent Application No. Hei 4[1992]-293169, published Oct. 16, 1992 (filing No. Hei 3[1991]-57351).

English Language Translation of Japanese Public Patent Disclosure Bulletin No. 0696160, dated Apr. 8, 1994 (application No. 04244646).

English Language Translation of Japanese Public Patent Disclosure Bulletin No. 06203108, dated Jul. 22, 1994 (application No. 5-154).

English Translation of Toshio Hoshi, "e-PAL 2000" Printed Circuit Board CAD/CAM System, Denshi Zairyo [Electronic Parts and Materials], Oct. 2001, pp. 153-156 (copy of Japanese original included).

English Translation of Yoshiki Koyanagi: Stella Station Multi CAD/CAM System for the Next Generation of Printed Circuit Boards. Denshi Zairyo [Electronic Parts and Materials]. Oct. 2000, pp. 96-101 (copy of Japanese original included).

English translation of Japanese Kokai Patent Application No. Hei 7[1995]-98726, published Apr. 11, 1995 (filing No. Hei 5[1993]-311532), pp. 6-37.

English translation of Japanese Kokai Patent Application No. Hei 4[1992]-68470, published Mar. 4, 1992 (filing No. Hei 2[1990]-180448).

English translation of Japanese Kokai Patent Application No. Hei 5[1993]-14942, published Mar. 26, 1993 (filing No. Hei 3[1991]-259923).

English translation of Japanese Kokai Patent Application No. Hei 10[1998]-307855, published Nov. 17, 1998 (filing No. Hei 9[1997]-118134).

Translation of Japanese Kokai Patent Application No. Hei 2[1990]-48774, published Feb. 19, 1990 (filing No. Sho 63[1988]-199358).

English language translation of Japanese Public Patent Disclosure Bulletin No. 9-62726, dated Mar. 7, 1997 (application 7-220142).

Translation of an Office Action for JP2003551712 dated May 29, 2007.

"Version Management with CVS for CVS 1.12.9", Internet Citation, Jun. 9, 2004, pp. 65-74, retrieved from <http://ftp.gnu.org/non-gnu/cvs/source/feature/1.12.9/cederqvist-1.12.9.p>, retrieved on Jan. 24, 2005.

* cited by examiner

RESERVATION OF DESIGN ELEMENTS IN A PARALLEL PRINTED CIRCUIT BOARD DESIGN ENVIRONMENT

CROSS-REFERENCE TO RELATED APPLICATIONS

This application is a continuation-in-part of U.S. patent application Ser. No. 10/780,902, filed Feb. 19, 2004 and titled "Parallel Electronic Design Automation: Shared Simultaneous Editing," which application is a continuation of U.S. patent application Ser. No. 10/269,614, filed Oct. 10, 2002 and titled "Parallel Electronic Design Automation: Shared Simultaneous Editing" (now U.S. Pat. No. 6,708,313), which application claims the benefit of U.S. Provisional Application Ser. No. 60/341,037, filed Dec. 10, 2001. This application also claims the benefit of U.S. Provisional Application Ser. No. 60/523,697, filed Nov. 21, 2003, titled "A Revolutionary Design Technology." All of said applications are hereby incorporated by reference in their entireties.

COPYRIGHT NOTICE

A portion of the disclosure of this patent document may contain material which is subject to copyright protection. To the extent that it does, the copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2003–2004, Mentor Graphics Corp., All Rights Reserved.

FIELD OF THE INVENTION

This invention relates to the field of electronic design automation tools, and more specifically, to a mechanism for facilitating ease of use and conflict avoidance in a shared environment for parallel printed circuit board (PCB) design.

BACKGROUND OF THE INVENTION

A printed circuit board ("PCB") often begins as a schematic diagram by which an electrical engineer describes an electronic circuit as a logical diagram of symbolic representations. The schematic may then be used to lay out various electronic components, and the connections (e.g., netlines, routes, traces) between those components may be routed. Ultimately, a PCB design is created and data for the PCB design can be electronically stored. That data can be used to generate artwork corresponding to a pattern of components and connections between those components. The artwork, in turn, can be used with photographic imaging techniques to manufacture the PCB.

Many users may be involved during the layout process. Traditionally, this has been accomplished via a design splitting mechanism whereby each user can check out a corresponding (assigned) piece of the design to make edits to the PCB layout. FIG. 1 is a block diagram that illustrates a prior art system for designing a PCB. The system comprises a plurality of clients 102, 104, 106 and a server 100, where the server 100 comprises a database 108 to store a master PCB design 116 (hereinafter "master design"), and each of the clients 102, 104, 106 enables users connected thereto to request edits to the master design 116. As used herein, a master design refers to a PCB design which can be edited by the users. Under the illustrated prior art, each user opens a unique piece 110, 112, 114 of the master design 116 to work on. A user may open a corresponding piece 110, 112, 114 of the design 116 from the database 108 and make edits to the corresponding piece 110, 112, 114 of the design 116. However, the user cannot see what edits are being made to the master design 116 by other users, and how edits to the other areas of the master design 116 affect the user's corresponding area. For example, a user on client 102 edits and only sees piece 110 of the master design; a user on client 104 edits and only sees piece 112 of the master design; and a user on client 106 edits and only sees piece 114 of the master design. Upon completion, or at the user's request, the corresponding piece 110, 112, 114 may be checked back into the database 108. At a later time, any of the users can check out a corresponding piece 110, 112, 114 of the master design 116 to see how the compiled, totality of edits made by all users up to that point affect the user's corresponding piece.

Using the above-described approach, a user is limited to viewing only areas of the design that are opened by that user. Consequently, the user cannot see edits that are made to the rest of the board while the user's edits are being made. There remains a need for systems and methods whereby multiple users can simultaneously edit the same portions of a PCB design, but can also prevent conflicts between the users.

SUMMARY OF THE INVENTION

Embodiments of the invention include methods for simultaneous editing of at least a portion of a printed circuit board (PCB) design by multiple users. Such methods include receiving design data at each of first and second clients. The design data includes graphically displayable information regarding a pattern of electronic components and connections between those components for at least a portion of the design. The design data also includes data corresponding to at least a portion of a shared area of the design, and the shared area is simultaneously editable by both of the clients. The method further includes generating a first boundary associated with a part of the shared area being edited at the first client, displaying the first boundary at the second client, and preventing the second client from editing parts of the shared area within the first boundary. In some embodiments, the protection boundary surrounds a user's cursor. The size of the boundary may increase based on editing activity by the user in an area of a PCB design. Additional embodiments of the invention include computer readable media having instructions for performing steps of various method embodiments of the invention.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

One aspect of the invention relates to a method for allowing a user to edit a PCB design concurrently with allowing the user to view edits to the PCB design by other users. Generally, the method displays a PCB design to a plurality of users. While a first user makes edits to an arbitrary section of the PCB design, a second user makes edits to an arbitrary section of the PCB design while preserving the integrity of the master design. In one embodiment of the invention, arbitrary sections may overlap, allowing each user to edit shared areas of the master design. In another embodiment of the invention, arbitrary sections are mutually exclusive, such that each user edits unshared, exclusive areas of the master design.

The present invention includes various operations, which will be described below. The operations of the present invention may be performed by hardware components or may be embodied in machine-executable instructions, which may be used to cause a general-purpose or special-purpose processor or logic circuits programmed with the instructions to perform the operations. Alternatively, the operations may be performed by a combination of hardware and software.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electromagnetic Erasable Programmable Read Only Memories), magnetic or optical cards, flash memory, or other type of media/machine-readable medium suitable for storing electronic instructions.

Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Figure 1:
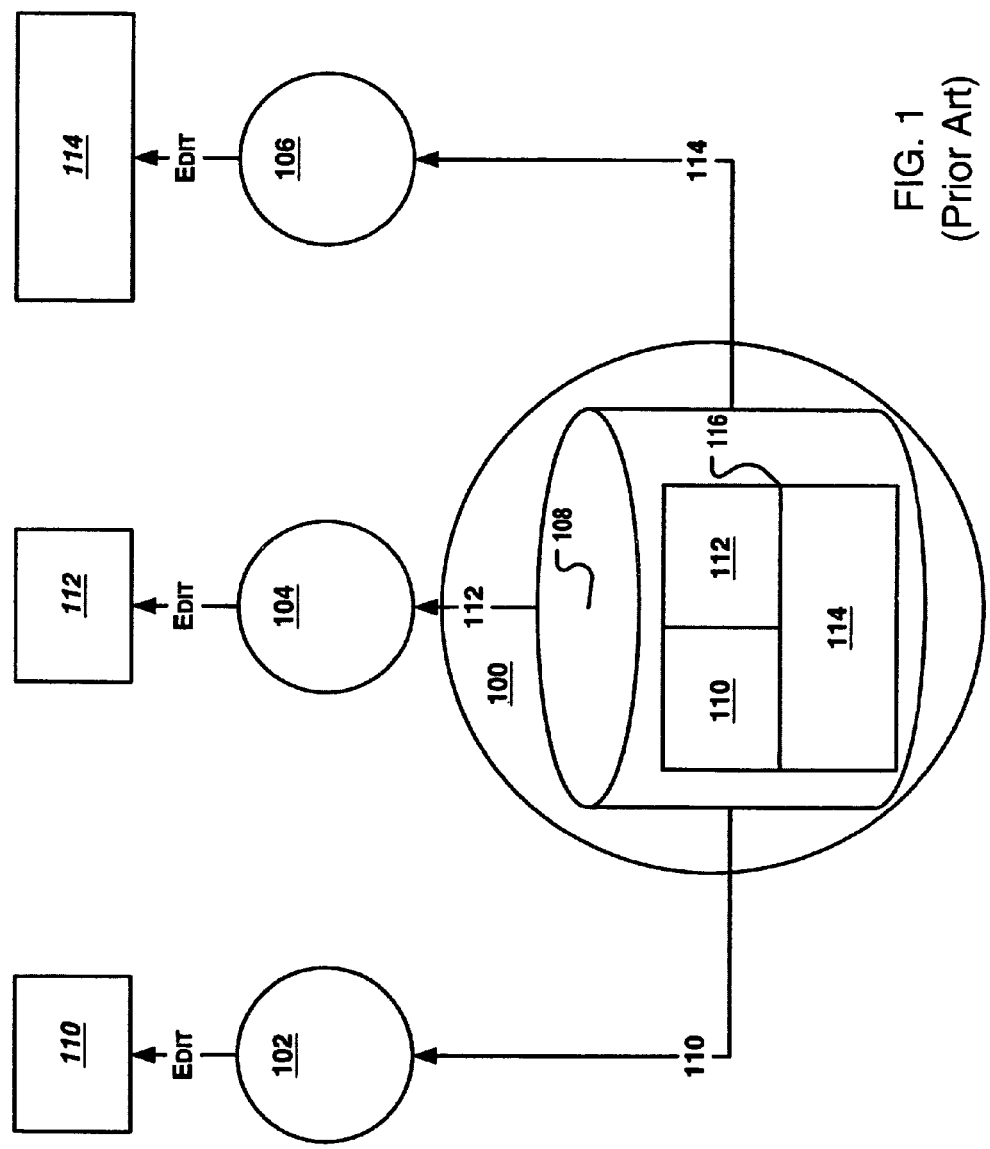
FIG. 1 is a block diagram illustrating a prior art system for PCB design, where individual sections of a master design are checked out by users.
Figure 2:
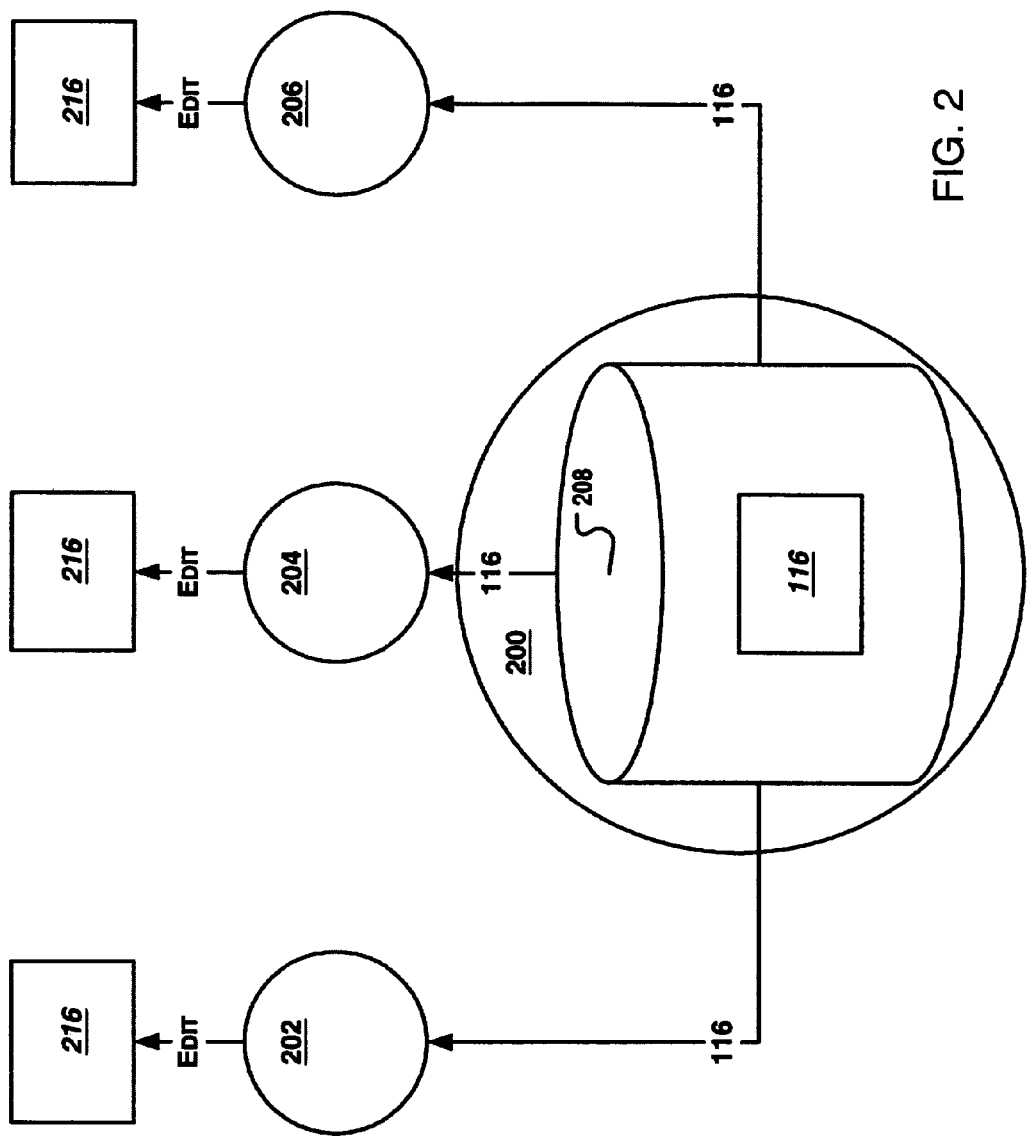
FIG. 2 is a block diagram illustrating a general embodiment of the invention, where users are given parallel access to a master design for editing.

FIG. 2 is a block diagram that illustrates a system for parallel PCB design in accordance with general embodiments of the invention. It comprises a plurality of clients 202, 204, 206, a server 200, where the server 200 has a database 208 for maintaining a master design 116.

Each client 202, 204, 206 enables users to request edits to the master design 116 in parallel with one another while viewing edits made to the master design 116 by other users. Master design 116 comprises the version on the server 200 database 208 which incorporates edit requests from clients that are accepted by the server 200, and may also be referred to as the compiled master design. Master design 216 comprises the version that is edited by a user on a given client 202, 204, 206.

When a PCB design is displayed (i.e., master design 216), it may comprise the entire PCB design, or it may comprise a partial PCB design. For instance, the master design 116 may be distributed amongst several user groups, and embodiments of the invention may be applicable to each user group, such that for a given user group, only their sections are displayed, thereby displaying only a partial PCB design. However, the sections displayed for that user group may comprise shared and exclusive areas as described herein.

A user on client 206, for example, may request edits to the master design 116, and the edit requests are submitted to the server 200. The server 200 processes the edit requests and either accepts the edit requests or rejects them. Rejected edit requests are reported back to the requesting client 206. Accepted edit requests are applied to the master design 116. Clients 202, 204, 206 can then be synchronized with master design 116.

In embodiments of the invention, parallel PCB design gives users the ability to view a compiled master design 116 while requesting edits to the master design 116. In one embodiment, one user may simultaneously edit shared areas of the master design with another user while viewing the master design 116 (shared PCB design). In another embodiment, one user may simultaneously edit unshared, exclusive areas of the master design 116 (distributed PCB design) with another user while viewing the master design 116.

An edit request may comprise a list of one or more objects and corresponding commands made by the particular user. Objects include routes, components, traces, vias, text, and drawing objects, for example; and commands include move left, move right, delete, or add, for example.

Figure 3:
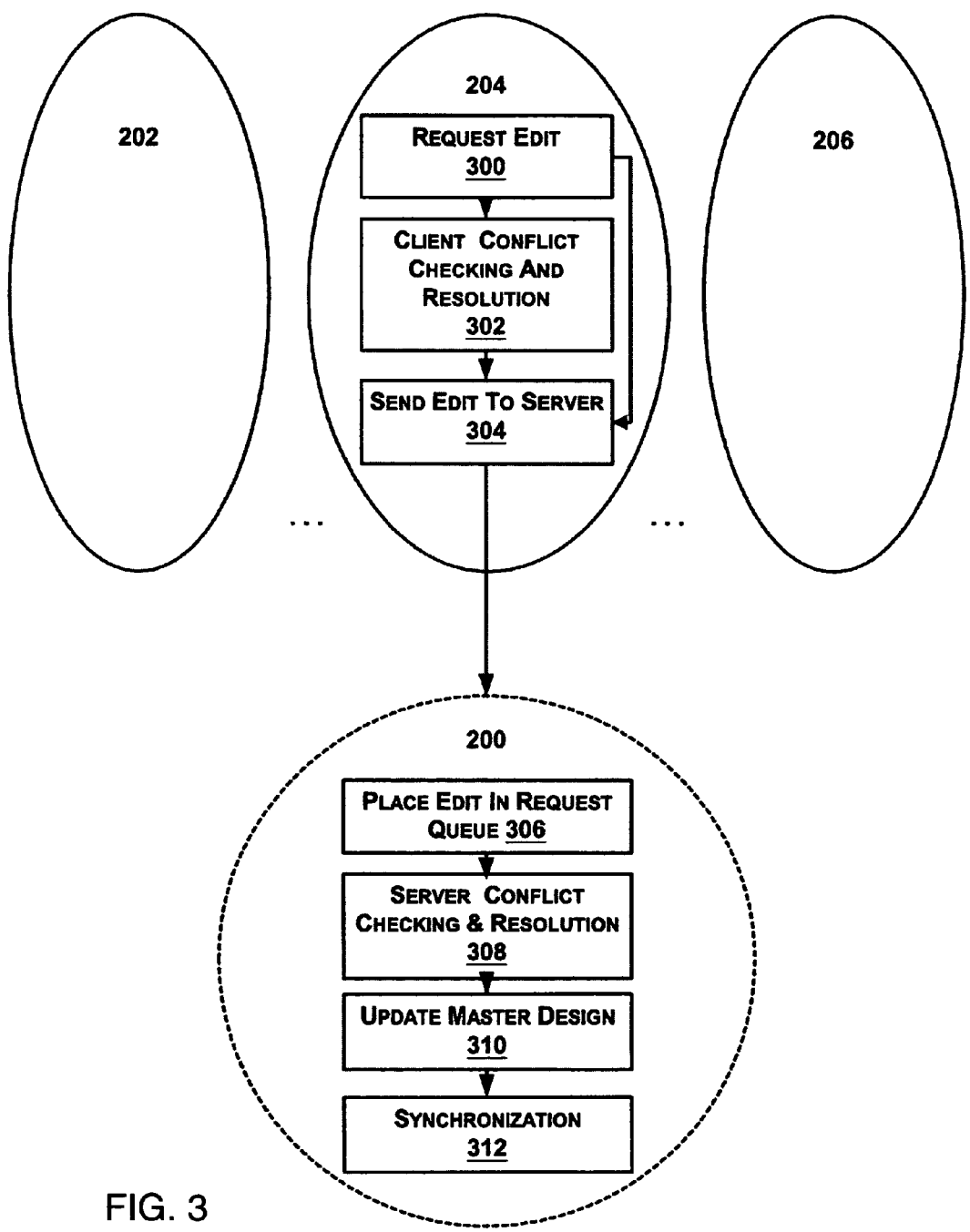
FIG. 3 is an entity diagram illustrating a general embodiment of the invention.

FIG. 3 illustrates an entity diagram. It comprises n clients 202, 204, and 206, and a server 200. A compiled master design is presented to the users. A user connected to a given client 204 makes an edit request 300 to edit the master design. If the client 204 has resources for conflict checking and resolution 302 (to be discussed), then the task is performed by the client. If client conflict checking and resolution passes, or if client conflict checking and resolution does not exist, then the edit request 300 is submitted to the server 304. If client conflict checking and resolution does not pass, then the edit request is rejected and another edit request 300 may be made.

Once an edit request 300 is submitted to the server 304, the edit request 300 is placed in a request queue 306 of the server. The request queue may comprise a FIFO (first-in-first-out) queue where edit requests submitted first are processed first; or a priority queue, where certain edit requests (i.e., types of requests, or requests from certain clients) are given priority over other edit requests, for example. When the edit request is eventually taken off the request queue, server conflict checking and resolution 308 (to be discussed) are performed on the edit request. If server conflict checking and resolution passes, then the edit is accepted and the master design is updated 310. The clients can then be synchronized with the master design 312.

The following comprise examples of how edits can be detected:
- When a user moves an object, he selects it, moves it, and then releases it. An edit is detected once the object has been released.
- When a user deletes an object, he selects it, and selects a delete command. An edit is detected when the delete command is selected. (The delete command may embody many variations. For example, a delete button may be selected, or the object to be deleted may be placed in a recycle bin.)
- When a user adds an object, an object to be added is selected, placed on the master design, and then released. An edit is detected when the object to be added is released.

Shared PCB Design

Figure 4:
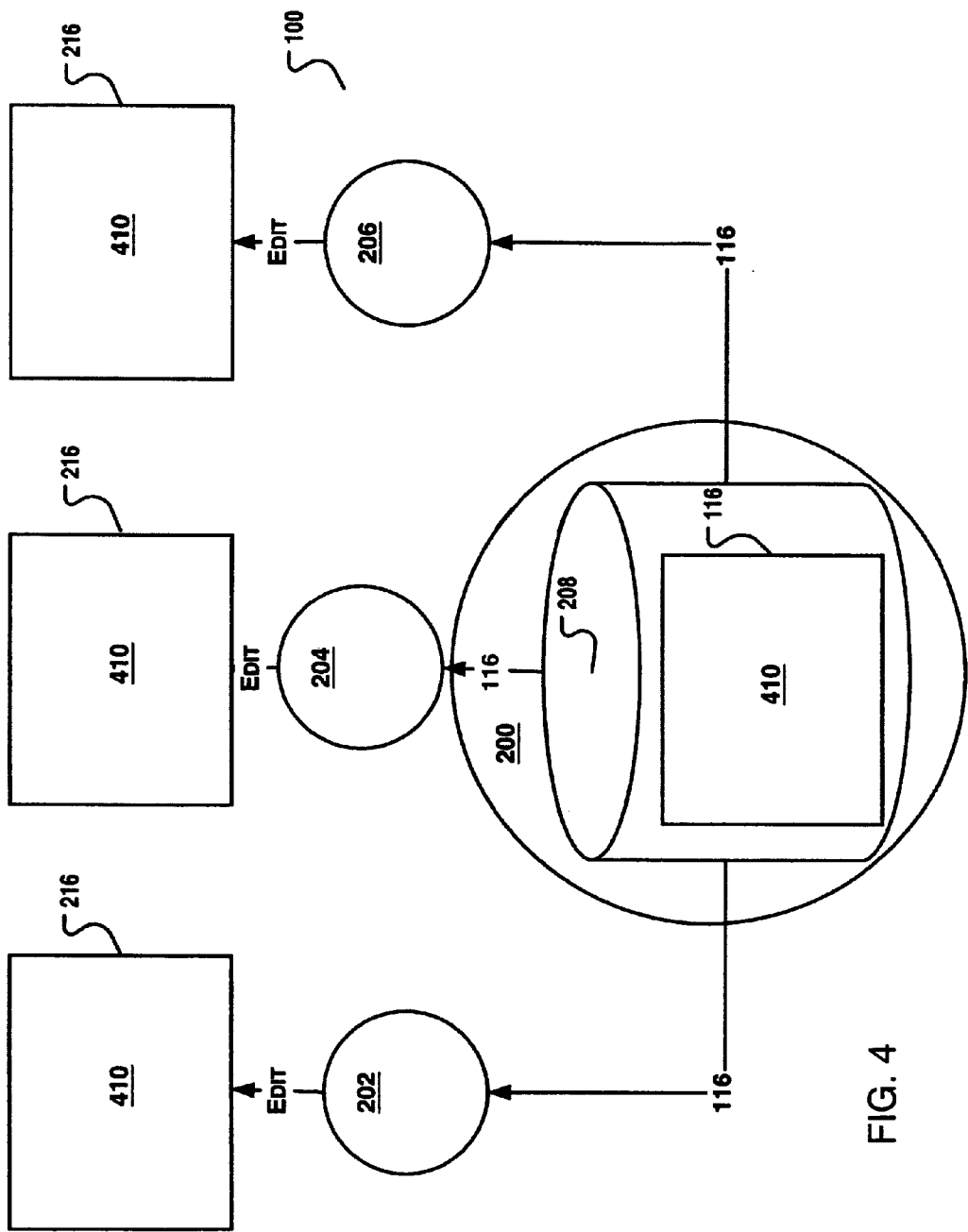
FIG. 4 is a block diagram illustrating a first embodiment of the invention, where parallel access is implemented by giving users concurrent editing access to shared areas of a master design.

In one embodiment of the invention is a shared editing system, as illustrated in FIG. 4, where a plurality of users 202, 204, 206 may simultaneously edit shared area 410 of a PCB design 116, giving each of the users shared access to the PCB design. In embodiments of the invention, shared areas comprise areas of the master design that can be accessed and edited by multiple users. On the other hand, exclusive areas are partitioned and assigned to individual users. Exclusive areas are discussed in further detail in the section entitled "Distributed PCB Design".

For purposes of illustration, it is assumed that the entire board comprises shared areas such that each of the users on the clients 202, 204, 206 can simultaneously edit and view objects in the entire master design 116, subject to access rights, discussed below. It is also contemplated that shared areas may comprise a subset of areas on a master design 116, such that the master design 116 comprises both shared and exclusive areas. In this latter scenario, edits to the master design 116 in exclusive areas are validated by a corresponding client conflict checking and resolution module; and edits to the master design 116 in shared areas may be validated by a corresponding client conflict checking and resolution module, a server conflict checking and resolution module, or both.

Figure 5:
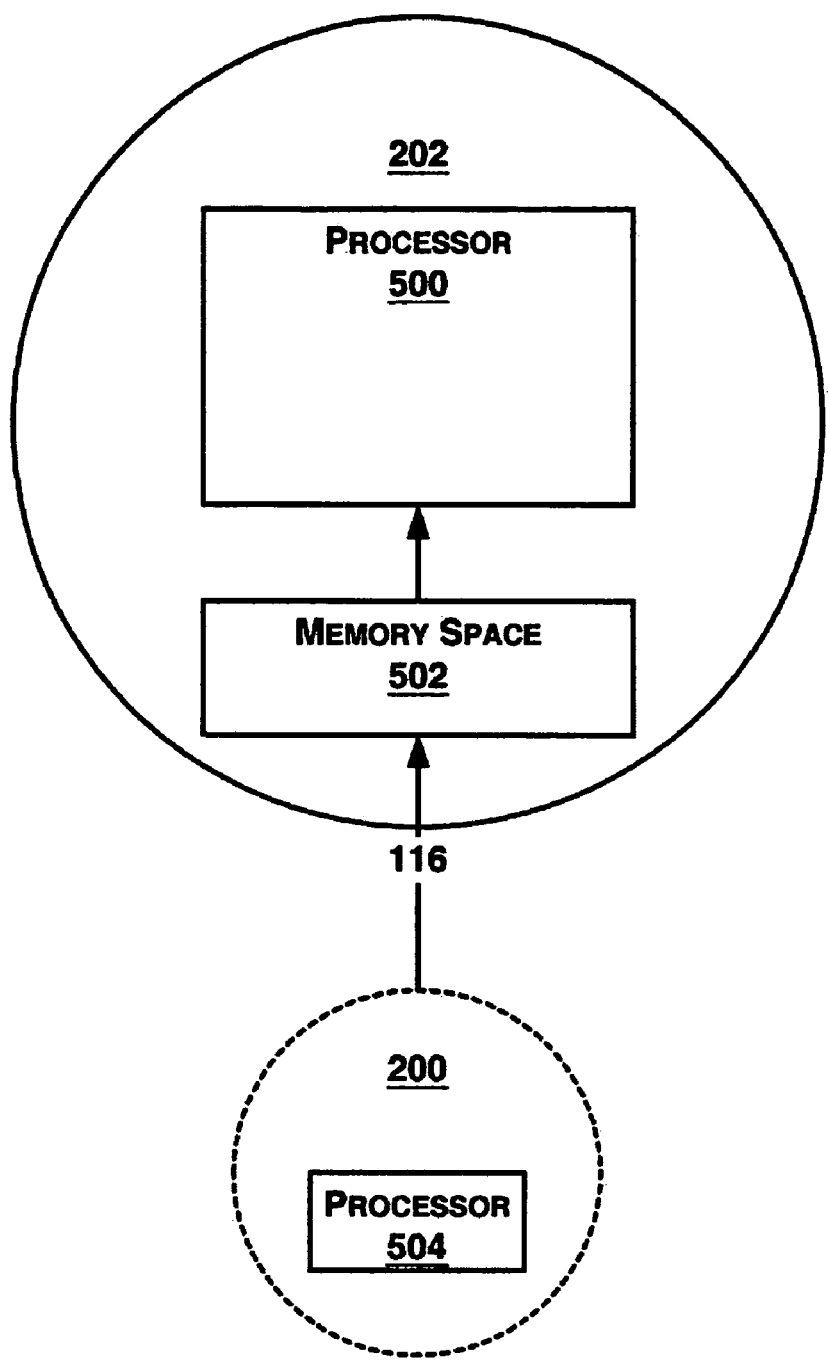
FIG. 5 is an entity diagram illustrating interaction between a client and a server in accordance with general embodiments of the invention.

In FIG. 5, a client 202 (only one shown) corresponds to a given user and comprises a processor 500 and an optional memory space 502. The server 200 comprises a processor 504 as well. While illustrated as a one-to-one client-server, and user-client relationship, it should be understood by one of ordinary skill in the art that the configuration is not to be so limited. It should be understood that any single client is merely a portal that allows a user to edit the master design 116 simultaneously with other users. Furthermore, the server 200 should be understood as an appliance for coordinating and managing the edits to the master design 116.

In one embodiment, the master design 216 comprises master design 116 on a client, such as on a thin client (i.e., client having minimal processing resources), where all edit requests are submitted to the server 200. In this embodiment, the server 200 performs all conflict checking and resolution operations to determine whether the edit requests are acceptable, to be discussed.

In another embodiment, master design 216 comprises a copy of the master design 116 in a client's memory space. In this embodiment, conflict checking and resolution operations may be performed by a processor 504 on the server 200 alone, on a processor 500 by the client 202 alone, or may be distributed in various proportions between the respective processors of a given client 202, 204, 206, and the server 200. These are described in more detail below.

Access Rights

In general embodiments of the invention, each user has access to the same aspects of the master design as any other user, subject to assignment restrictions (discussed below in "Distributed PCB Design"). In one embodiment, all users have the same access rights. For example, a first user may request edits to the same objects and commands as a second user. In another embodiment, access rights of each user may differ. For example, a first user may only request edits to components, and a second user may only request edits to routes.

Conflict Checking and Resolution

When an edit request is received, conflict checking and resolution operations are performed. Conflict checking comprises checking to prevent edits that violate one or more design rules. Design rules ensure that the design adheres to a predetermined set of rules in order to minimize the probability of fabrication defects. A design rule checker may check for spacing violations, geometry violations, and connectivity violations, for example. For example, when two traces are placed next to each other that are closer than a spacing rule, a design rule violation occurs.

Conflict resolution comprises detecting edits that may conflict, but which may be resolved. For example, if two traces are too close and violate a design rule, then one trace can be moved to resolve the conflict.

Figure 6:
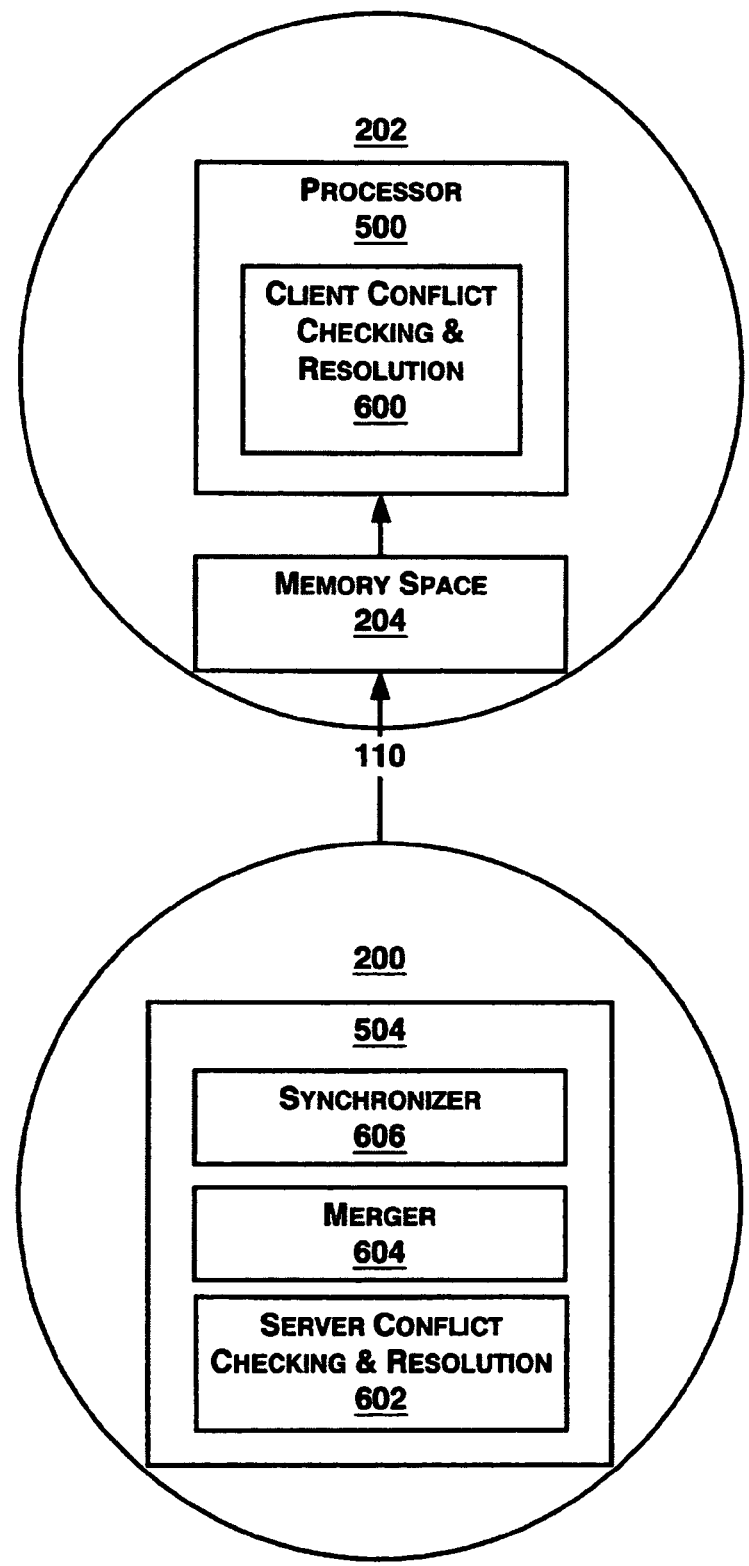
FIG. 6 is an entity diagram illustrating interaction between a client and a server in accordance with a first embodiment of the invention.

As illustrated in FIG. 6, client conflict checking and resolution and server conflict checking and resolution may coexist, or they may exist in isolation. When they coexist, a client conflict checker and resolution module 600 of a client 202 determines if the master design 216 on the client has any conflicts. If there is a conflict, it is determined if the conflict can be resolved.

If the conflict can be resolved, or if there are no conflicts, then the client conflict checker and resolution module 600 sends the edit request to the server conflict checker and resolution module 602 of the server 200 to determine if any conflicts exist with the master design 116 on the server.

If conflicts exist, then the server conflict resolution module 602 may determine if the conflicts may be resolved. If no conflicts exist, then the edit requests are accepted, and a merger unit 604 of the server 100 applies the edit requests into the master design data structure.

A synchronizer 606 of the server 200 then synchronizes the one or more clients 202, 204, 206 with the compiled master design 116. Synchronizing may comprise, for example, sending master design 116 to a single client upon request from the client; broadcasting master design 116 to all or multiple clients upon request from multiple clients; automatically swapping out a client copy of the master design data structure 216 on each of the clients 202, 204, 206 for the updated master design data structure 116 on the server 200 upon updating the master design; or automatically updating the clients' 202, 204, 206 displays upon updating the master design 116. Of course, these examples do not comprise an exhaustive list.

When conflict checking and resolution exist in isolation, either the server performs all conflict checking and resolution; or each client performs all conflict checking and resolution. The server may perform all conflict checking and resolution operations when, for example, clients are thin clients (i.e., clients having minimal processing resources), and the master design 216 on client comprises master design 116, where edit requests are submitted to the server 200. Clients may perform all conflict checking and resolution when, for example, a master design is partitioned and assigned to individual users such that no inter-client conflicts arise during editing (to be discussed in Distributed PCB Design). In this latter scenario, where edits are made in their respective exclusive areas, if any conflicts still exist after those edits are made (residual conflicts), the server may perform conflict checking and resolution operations. However, this is not necessary, as the residual conflicts may be taken care of after the edits have been applied.

When a server performs conflict checking and resolution, in cooperation with the client, or in isolation, the server may implement optimization functions to minimize its workload. For example, it may keep track of which client made the previous edit request that was merged so that if the next edit request comes from the same client, the server knows that it can eliminate certain conflict checking and resolution functions.

Example Shared PCB Editing Environment

Figure 15:
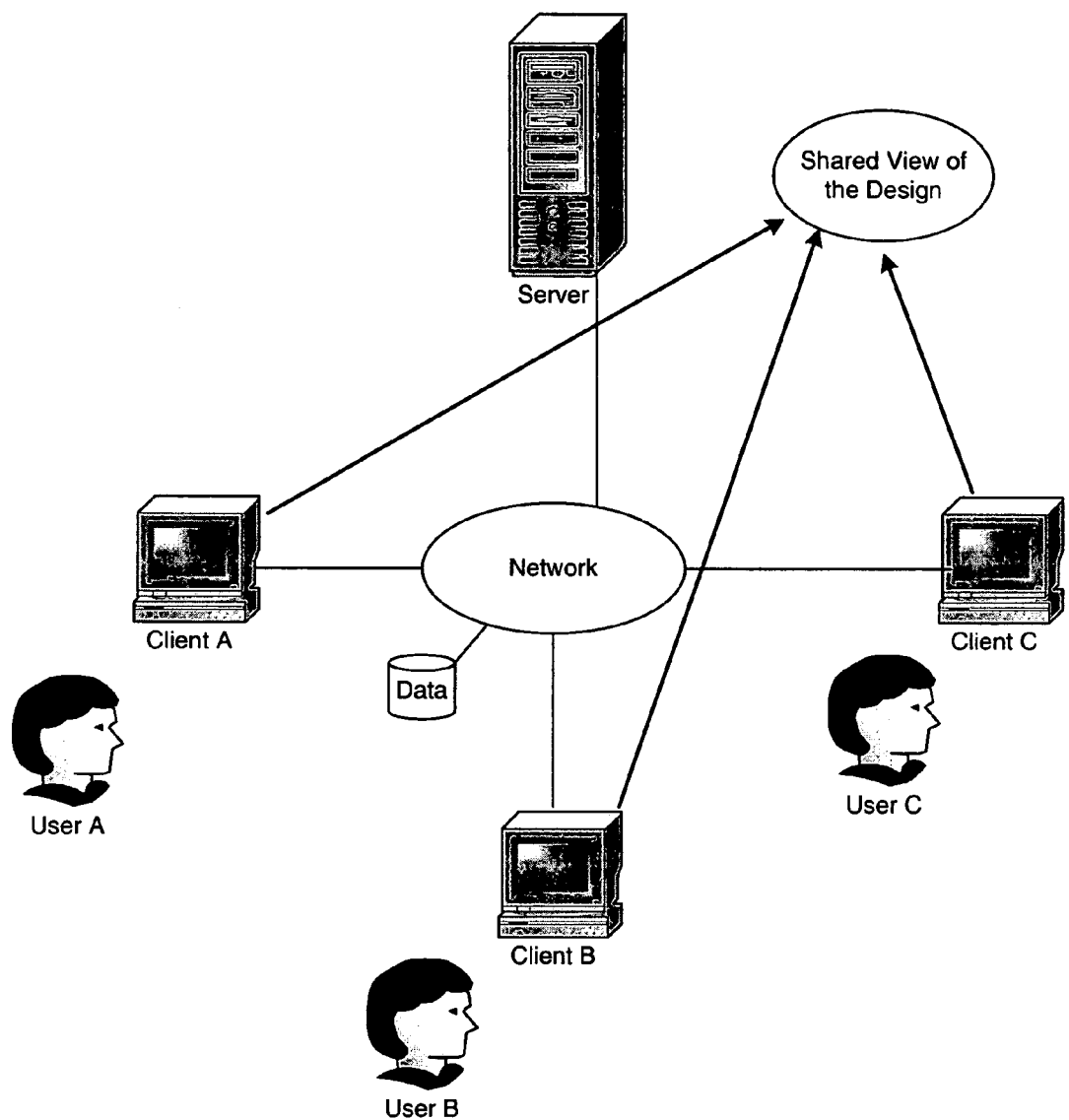
FIG. 15 is a conceptual diagram illustrating a shared simultaneous editing environment according to at least one embodiment of the invention.

FIG. 15 is a conceptual diagram illustrating a shared simultaneous editing environment according to at least one embodiment of the invention. A design session manager (or server) communicates in a networked environment with multiple design clients (clients A, B and C) operated by multiple users (users A, B and C). The server maintains a database containing the master PCB design. The database may be located at the server or elsewhere in the network (e.g., "data" in FIG. 15). Software executed by the server receives edit requests from each client, and checks each request to ensure it will not conflict with another edit or otherwise cause a design rule violation. If an edit request does not conflict or otherwise violate a design rule, the server accepts the edit and synchronizes each client to include that edit. Each client has a processor and memory. Each client is able to view the entire design, as well as edits corresponding to server-accepted edit requests from other clients.

Each printed circuit board design may have an associated design team. Members of the team are given access permission to the design data. A team member can start a design session on the server from a single client. Additional clients can then join the session. After the design is initially loaded on the server, each client is initialized and synchronized when joining the session. In particular, the current state of the design is downloaded from the server into the client memory. Once a client has joined the design session, a client user may request edits to the design using standard editing tools available in an application executing on the client.

Processing by the server is based upon edit events. An edit event is a discrete action by a client that is captured at the client and sent to the server as an edit request. For example, moving a component from point A to point B could constitute an edit event. In some embodiments, such an event automatically begins with the selection of a component and ends with a mouse click, mouse button release, coordinate entry indicating a new component location, or other design action using an editing tool in a client application. The client sends the edit request to the server as a transaction describing what is to be deleted, added and/or otherwise modified in the master design. As previously described, the client may perform a local design rule check (DRC) before transmitting an edit request to the server.

Figure 16:
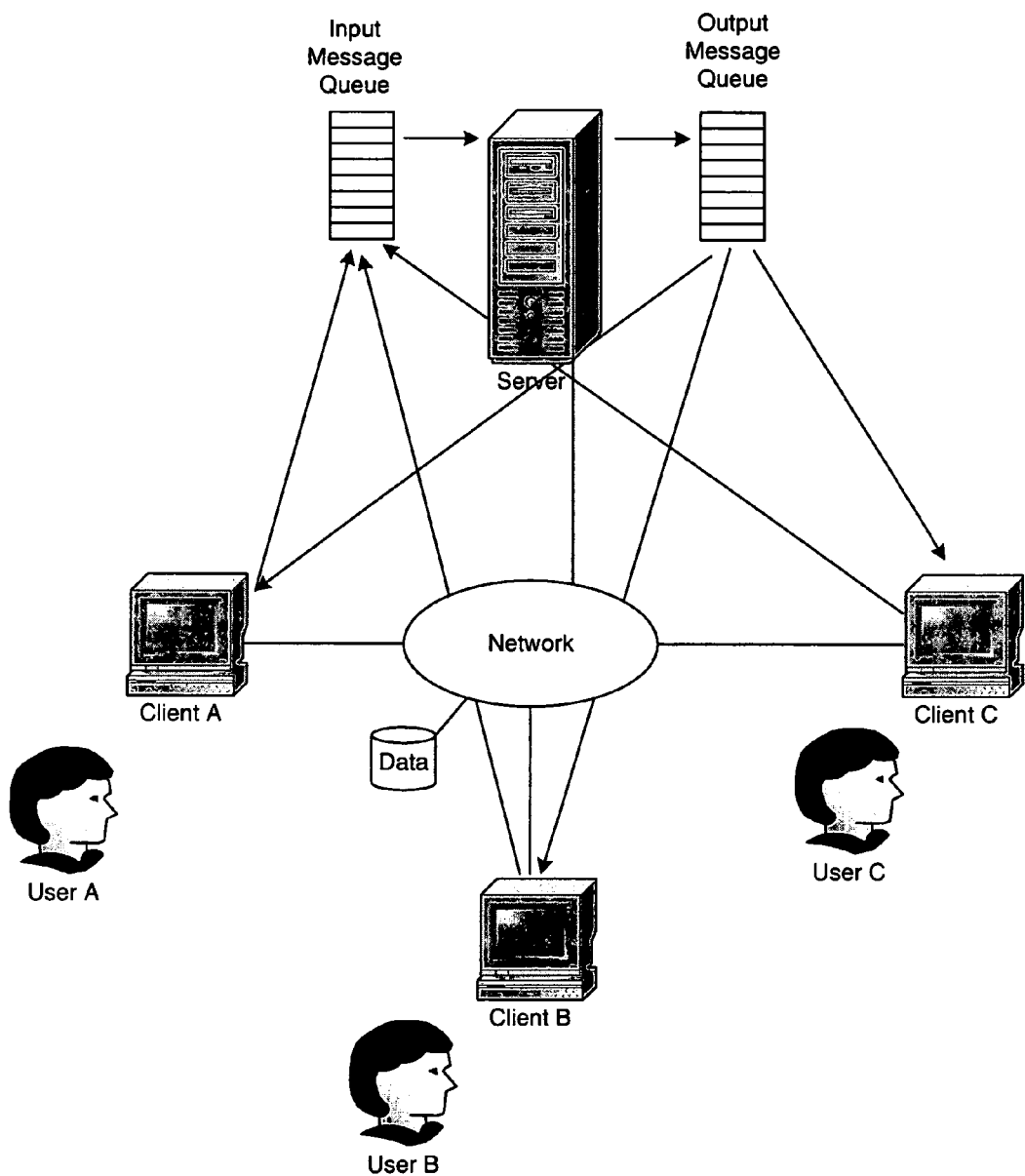
FIG. 16 is a conceptual diagram illustrating client-server messaging according to at least one embodiment of the invention.

Upon transmission of the edit request to the server, and as shown in FIG. 16, the request goes into an Input Message Queue. In some embodiments, each request in the queue has a FIFO (first-in-first-out) priority. In other embodiments, priority is assigned in another manner, e.g., as described above. The server takes each edit request from the Input Message Queue, integrates the requested edit into the design database, and performs a DRC upon the edit. Even if the client previously performed a DRC, the server also performs a DRC check because the design state in the server may have changed (because of another client's action) since the DRC performed by the client. If a violation is found (e.g., the edit conflicts with an edit previously submitted by the same or different client), the server may first attempt to correct the problem (e.g., slightly moving an object). If the problem is not correctable, the server rejects the edit request and returns the master design to the state occupied prior to integrating the requested edit. The server then notifies the client submitting the edit request of the rejection. If no violations are found, the edit request is accepted (i.e., the integrated edit is left in place) and a message is sent (through an Output Message Queue) to all the clients for synchronization of each client with the main database.

The client making an edit request does not treat the edit event as completed until the server broadcasts the synchronization message to all clients. This means that when, e.g., the original client clicks the mouse to complete an edit event, the edit is not confirmed graphically or otherwise until the confirmation notification and data update is sent to all clients to synchronize the clients with the server database. For example, the edit may be shown in a different color on the requesting user's display until confirmation notification is received.

In at least some embodiments, most computer processing occurs at clients. Objects are added, edited and deleted at the clients, and any automation associated with those edits is performed, such as push and shove (i.e., automatically moving objects or groups of objects), glossing (eliminating superfluous routes and other objects), etc. The server has a relatively light load compared to the clients and is unlikely to cause delays and/or other performance problems.

Conflict Prevention

Figure 7:
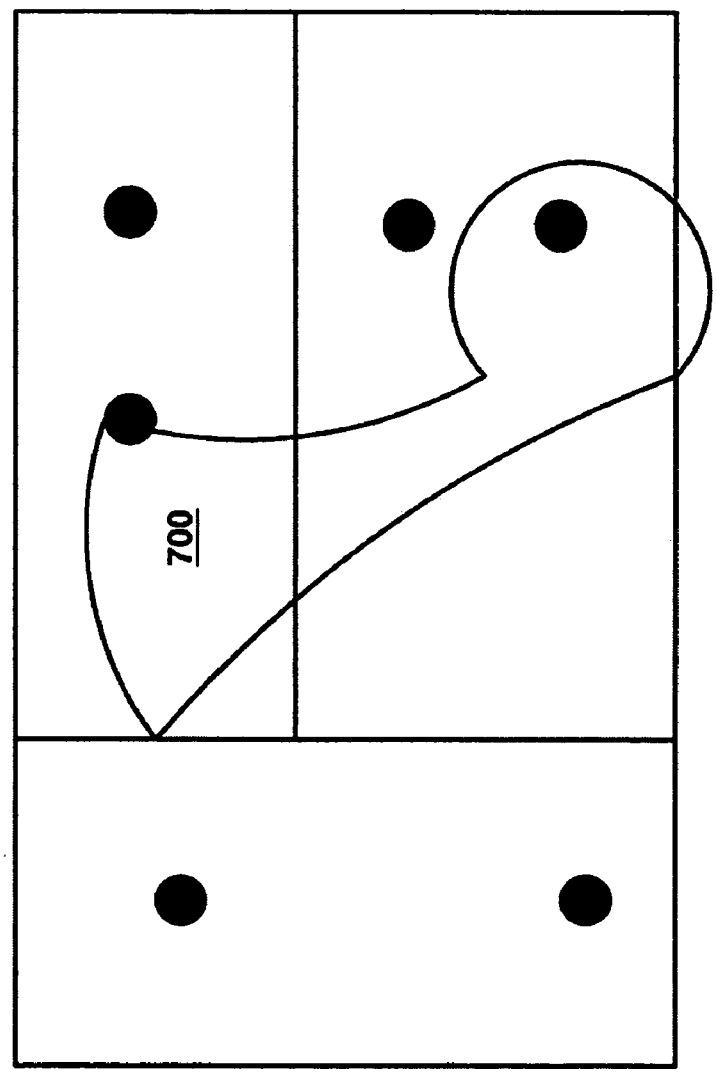
FIG. 7 is a block diagram illustrating a first conflict prevention mechanism.

To avoid conflicts from occurring in the first place, a number of conflict prevention mechanisms may be employed. One mechanism that can be used to prevent conflicts is the use of protection boundaries as illustrated in FIG. 7. A protection boundary 700 allows a user to draw a protection border around the user's workspace that temporarily reserves the area for the particular user. The protection border is broadcasted to all clients, and enables a user to edit the master design without encountering conflicts. The protection border may be removed at the user's request. If another user attempts to edit in an area contained in a protected border, a conflict checker prevents it and reports it as an error to the client on which the edit is being attempted.

Figure 8:
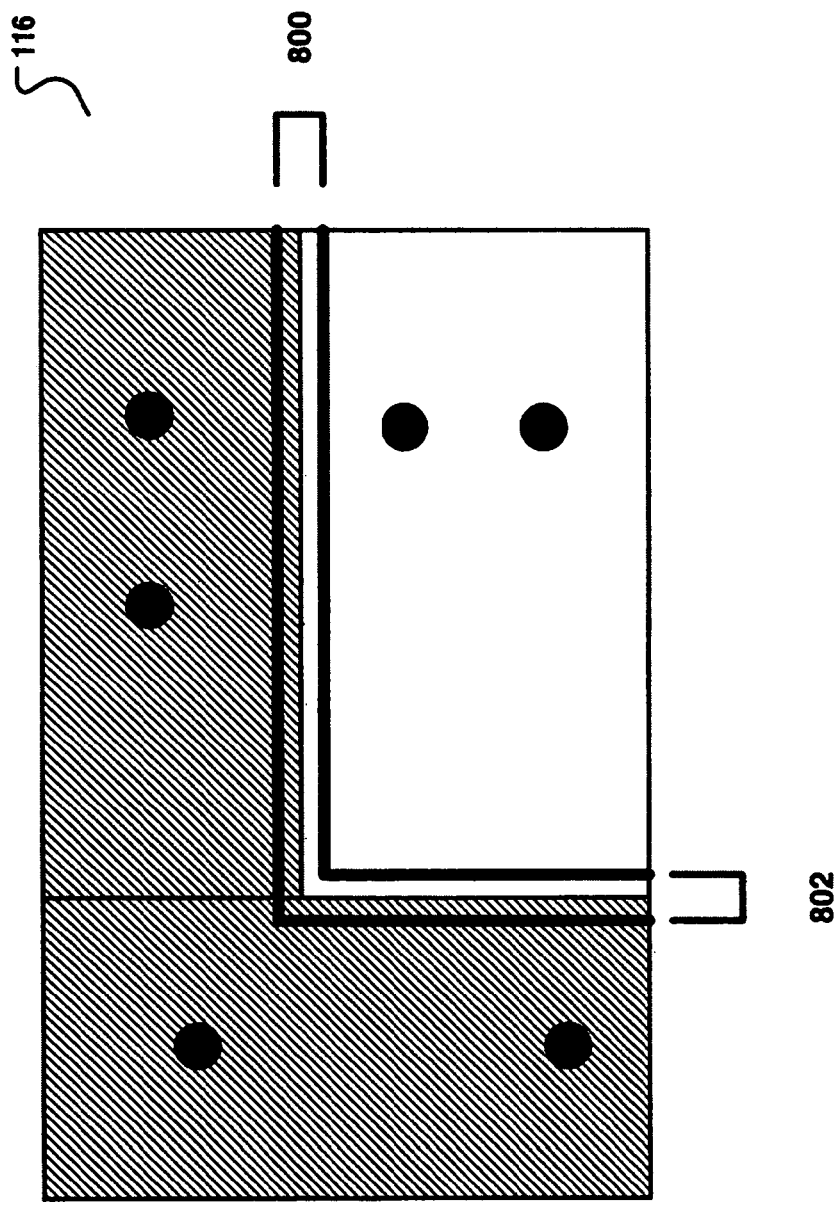
FIG. 8 is a block diagram illustrating a second conflict prevention mechanism.

As illustrated in FIG. 8, another mechanism for preventing conflicts is the use of force field widths 800, 802 along the boundaries of a user's working area to automatically provide a reasonable clearance around the working area. In one embodiment, the user's working area comprises the cursor, where a force field width is applied to the area around the cursor. In other embodiments, the working area may comprise an object closest to the cursor, where a force field width is applied to the area around the object. If another user attempts to edit within the boundaries of a working area protected by force fields, the conflict checker prevents it and reports it as an error to the client on which the edit is being attempted.

Figure 17:
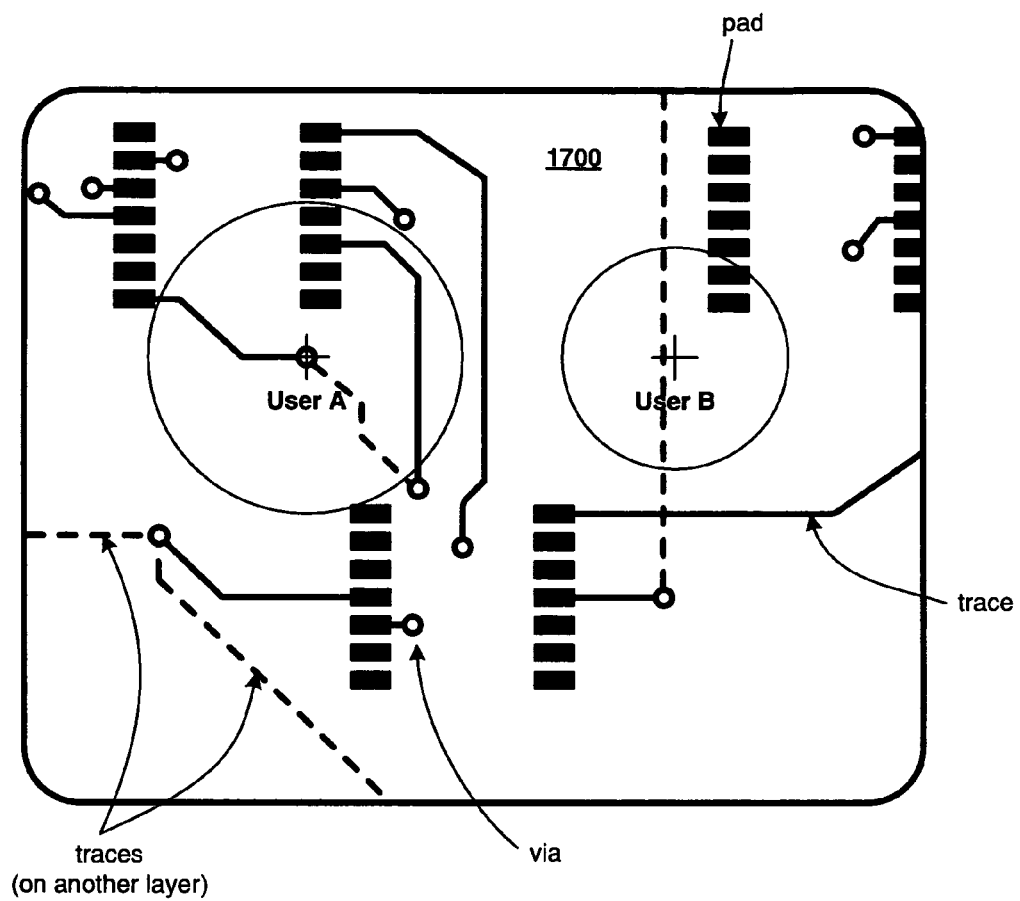
FIG. 17 shows "force field" widths applied to cursor positions for two users.

FIG. 17 shows force field widths applied to cursor positions for two users (User A and User B). FIG. 17 shows a client display of a portion of a PCB design 1700 being simultaneously edited by User A and User B. User A is performing editing operations at a first client (e.g., client A in FIG. 15), while User B is performing editing operations at another client (e.g., client B in FIG. 15). Other users may also be editing design 1700 from other clients. The display of FIG. 17 could be shown at any of the clients. In the example of FIG. 17, one or more users have already determined where various pads (black rectangles), conductive traces (lines) and vias (dark circles) will be located. As is the case with many PCBs, the PCB to be fabricated from design 1700 will have traces on multiple layers. In some embodiments, a client display shows traces color-coded by layer. For convenience, FIG. 17 shows traces on one layer in solid lines and traces on another layer are shown as dashed lines. Although only two layers are shown in FIG. 17, the invention is not limited by number of layers. So as not to obscure the drawing with unnecessary detail, FIG. 17 only shows a few of the many types of design elements that may be present in a PCB design, and the invention is not limited by type or number of design elements, nor by number of users simultaneously editing a design.

The current location within design 1700 of the cursor controlled by User A is represented as a "+" symbol labeled "User A." A circle around the User A cursor represents the force field width for User A. In other words, the region (or zone) inside the User A circle represents a portion of design 1700 that is protected from editing by other users having a lower priority than User A (user priority is described below). If a lower priority user attempts to edit within the protected zone of User A, that lower priority user receives a message indicating the edit is not permitted (e.g., a text message, a flashing cursor and/or other graphical indicator, etc.). Alternatively, in some embodiments, User A could be informed that a lower priority user is attempting to edit within the protected zone; User A could then be provided an opportunity to accept or reject that specific edit and/or an opportunity to accept or reject other edits from that user. The current location within design 1700 of the User B cursor is similarly shown as another "+" symbol labeled "User B," with a corresponding circle indicating the extent of the protected zone for User B. In at least some embodiments, each user's cursor and protected zone is shown in a different color.

As seen in FIG. 17, User B's protected zone is smaller than that of User A. In at least some embodiments, each client determines the size of the protected zone for the user editing the design from that client. A client may determine protected zone size based on various factors, such as user priority, user location in the design, prior editing actions by the user, etc. As described below, in at least some embodiments, the client divides design 1700 into a grid of cells and assigns each cell a weight value. Each time a user performs certain editing operations, the client increases the weight value for the cell containing the affected portion of design 1700. Using stored values for these cell weights within a certain proximity to the user's current cursor location, the client calculates a priority for that current cursor location. As a user priority increases, the size of the protected zone for that user increases. As the user priority decreases, the size of the protected zone decreases. So that cell weights (and thus priority and zone size) will correspond to design regions where a user has recently been active, the client automatically decreases cell weights over time. Example weighing and prioritizing procedures are described in more detail below.

FIGS. 18A through 20 illustrate calculation of priority and force field size by a client for a user editing design 1700 from that client. To more clearly explain these calculations, FIGS. 18A through 20 show the pads, traces and vias of design 1700 in a lighter shade. For similar reasons, the user cursors and force field circles are not shown in FIGS. 18A through 19E. FIGS. 18A through 18H show design 1700 at equally spaced times to through $t_7$, respectively. In other words, $\Delta t = t_7 - t_6 = t_6 - t_5 = \ldots = t_1 - t_0$. through 18H further show division of design 1700 into a series of square cells. The client stores a separate byte value for each cell. As edits are made to a portion of design 1700 corresponding to a particular cell, the client increases the byte value for that cell. As time passes, the byte value for a cell automatically decreases. In particular, at regular intervals separated by $\Delta t$, the client multiplies all cell weights by a decay factor (e.g., 0.9); in at least some embodiments, each weight value is rounded down to the nearest integer after multiplication by the decay factor. Although regular square cells are shown, the invention is not limited by the shape, size or regularity of cell size. In at least some embodiments, cell size (e.g., width of a square cell) is equal to approximately one-half of the maximum protected zone radius. For very large boards (or for small protected zones), cell size may be adjusted so that no more than one (1) megabyte is needed to store the cell weights.

Figure 18A:
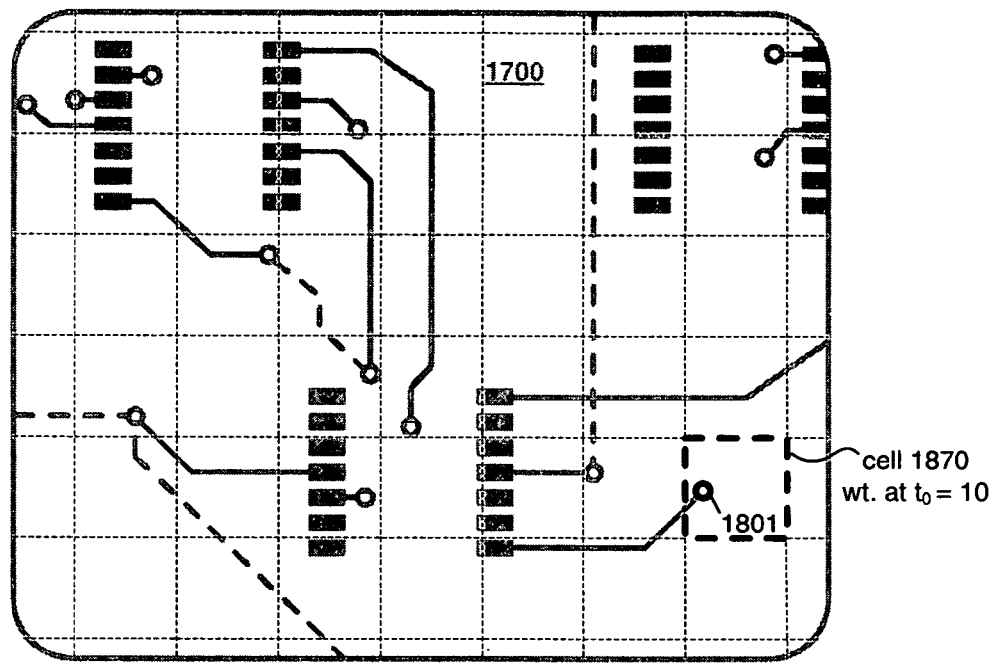
FIGS. 18A–18H show changes over time to weight values for portion of a PCB design.

FIG. 18A shows design 1700 at time $t_0$. The user has added via 1801 to a portion of design 1700 corresponding to cell 1870. The user may have added via 1801 in various manners. In some embodiments, the user adds a via by double-clicking a mouse button when the cursor is in a desired location for the via. Alternatively, the user may select a via from a menu, drag the via to the desired location, and release a mouse button to "drop" the via into place. When the user double-clicked or released a mouse button, or performed another appropriate action to add via 1801, the client added 10 to the weight of cell 1870.

Figure 18B:
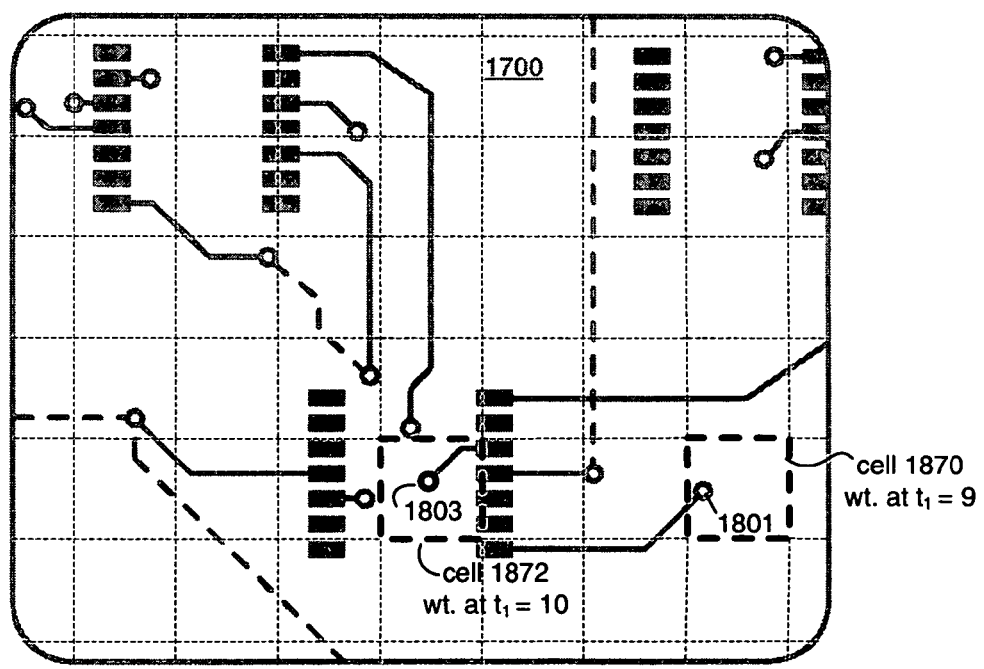

FIG. 18B shows design 1700 at time $t_0$. Because $\Delta t$ has elapsed, the client decreased the cell 1870 weight to 9 ($t_0$ weight of 10 multiplied by decay factor of 0.9). Because the user has added via 1803 in cell 1872, the client increased the weight of cell 1872 by 10.

Figure 18C:
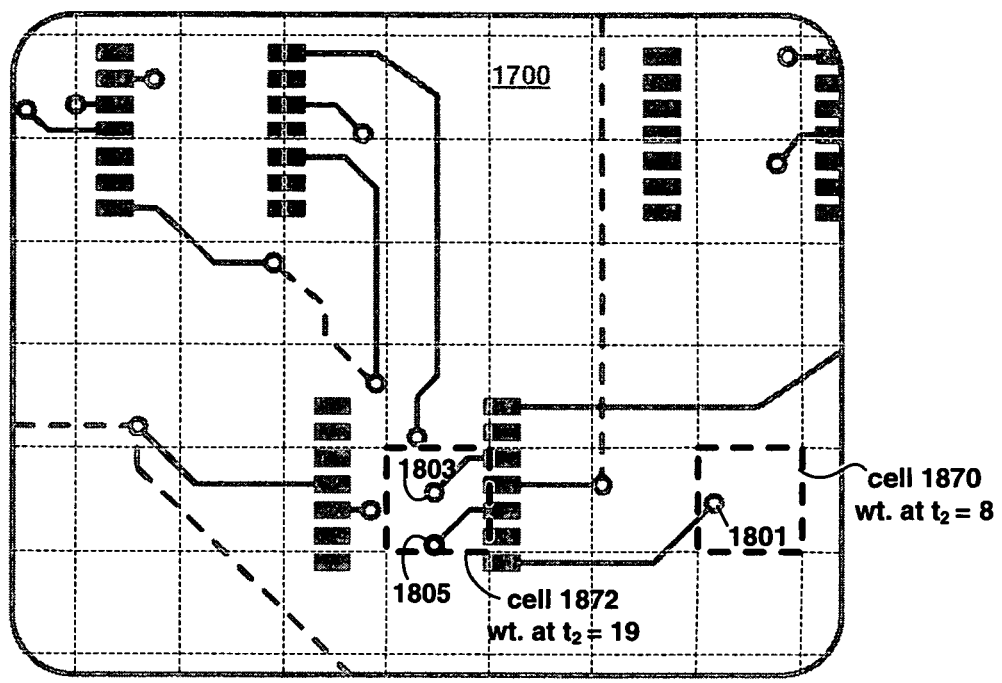
Figure 18D:
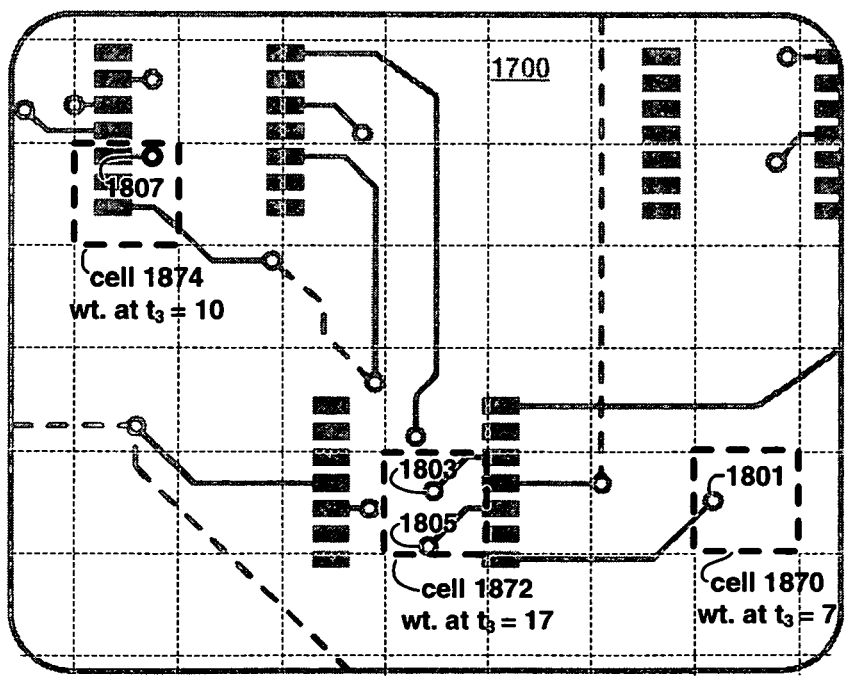
Figure 18E:
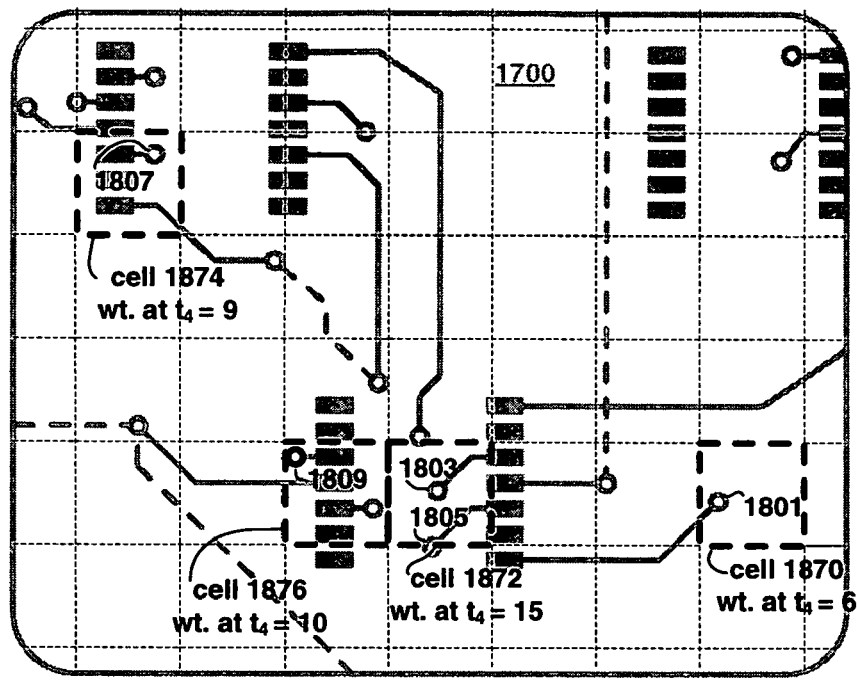
Figure 18F:
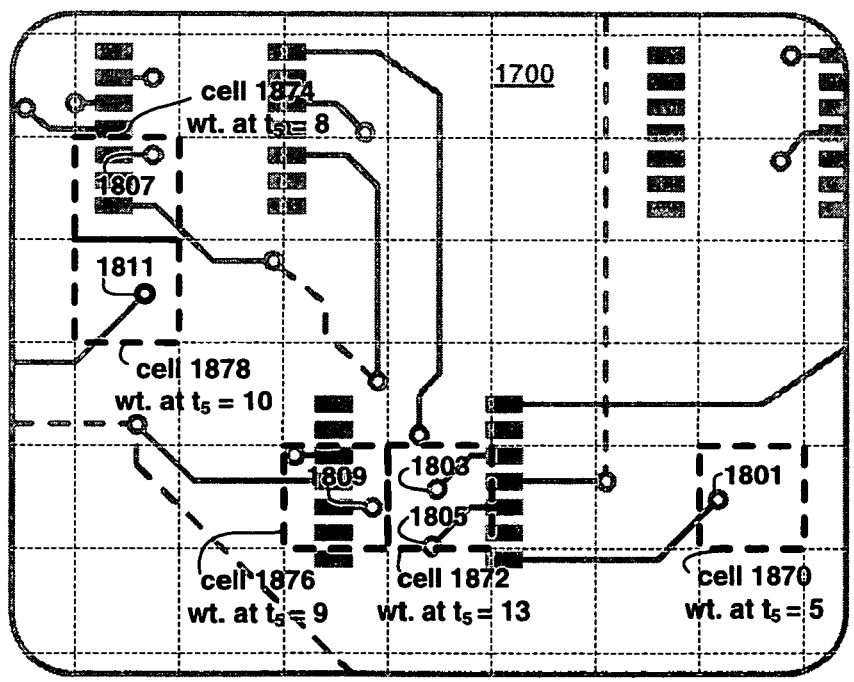

FIG. 18C shows design 1700 at time $t_2$. The client has again decreased the weight of cell 1870 by multiplying the $t_1$ weight (9) by the decay factor (0.9) and rounding down to the nearest integer (8). The client also reduced the weight of cell 1872 (containing via 1803) by multiplying the $t_0$ weight value for cell 1872 (10) by the decay factor (0.9) and rounding down to the nearest integer (9). After the client decreased the cell 1872 weight to 9, however, the user added via 1805 to another portion of design 1700 corresponding to cell 1872. When the user did so, the client added 10 to the cell weight, resulting in a $t_2$ cell weight of 19. If the user had added via 1805 just before elapsing of $\Delta t$ (i.e., before the cell 1872 weight was reduced from 10 to 9), the weight for cell 1872 at time $t_2$ would be 18 (i.e., (10+10)*0.9). The pattern of FIGS. 18A-18C continues for times $t_3$ (FIG. 18D; via 1807 added, cell 1874 weight increased, other cell weights decreased), $t_4$ (FIG. 18E; via 1809 added, cell 1876 weight increased, other cell weights decreased) and $t_5$ (FIG. 18F; via 1811 added, cell 1878 weight increased, other cell weights decreased).

Figure 18G:
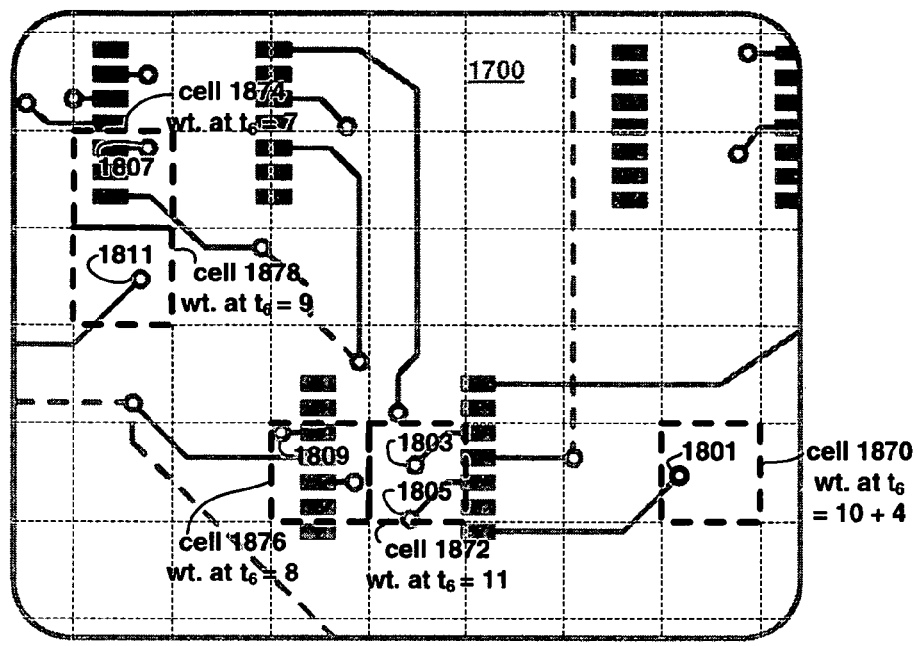
Figure 18H:
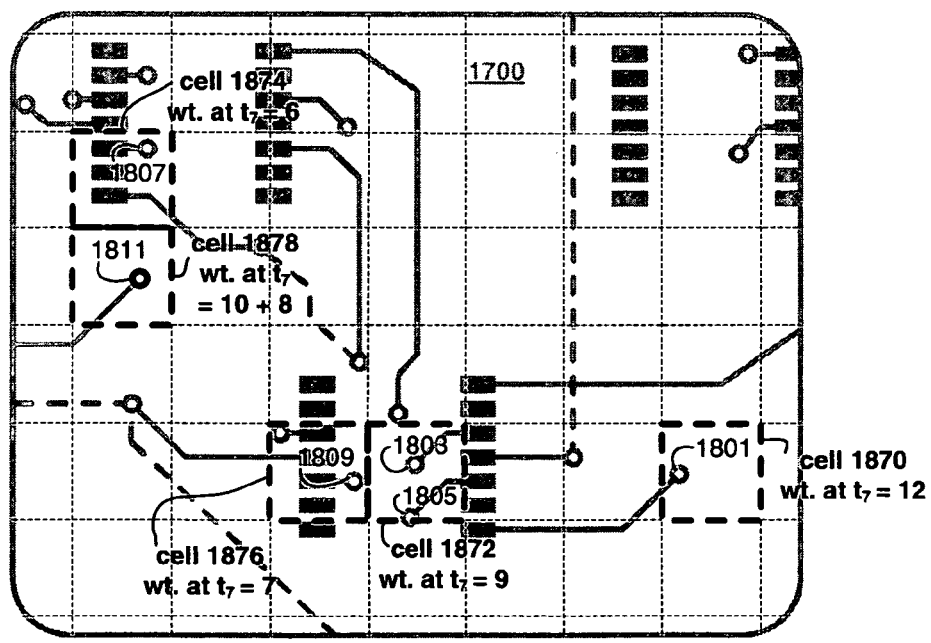

FIG. 18G shows design 1700 at time $t_6$. The user has not added any new vias or other design objects since time $t_5$. Through multiplication by the decay rate, the client has reduced all cell weights from their $t_5$ values. After the client reduced the cell weights, the user reselected via 1801 by clicking a left mouse button while the user cursor was positioned on the via. Because the client is configured to recognize object selection as an edit event (or as the beginning of an edit event), the client added 10 to the weight of cell 1870. Similarly, FIG. 18H shows design 1700 at time $t_7$. The user has still not added any new vias or other design objects since time $t_5$. The client has reduced all cell weights from their $t_6$ values, after which the user reselected via 1811. Accordingly, the client added 10 to the weight of cell 1878.

Figure 19A:
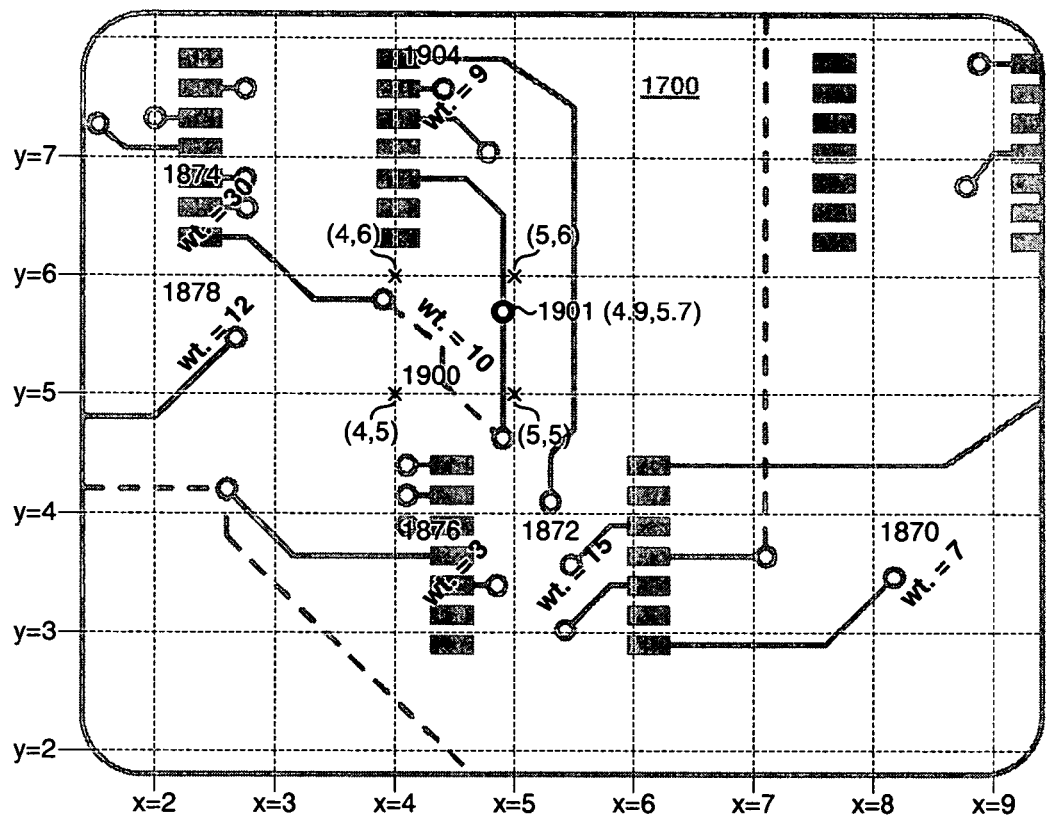
FIGS. 19A–19E show calculation of user priority for a particular PCB design location.
Figure 19B:
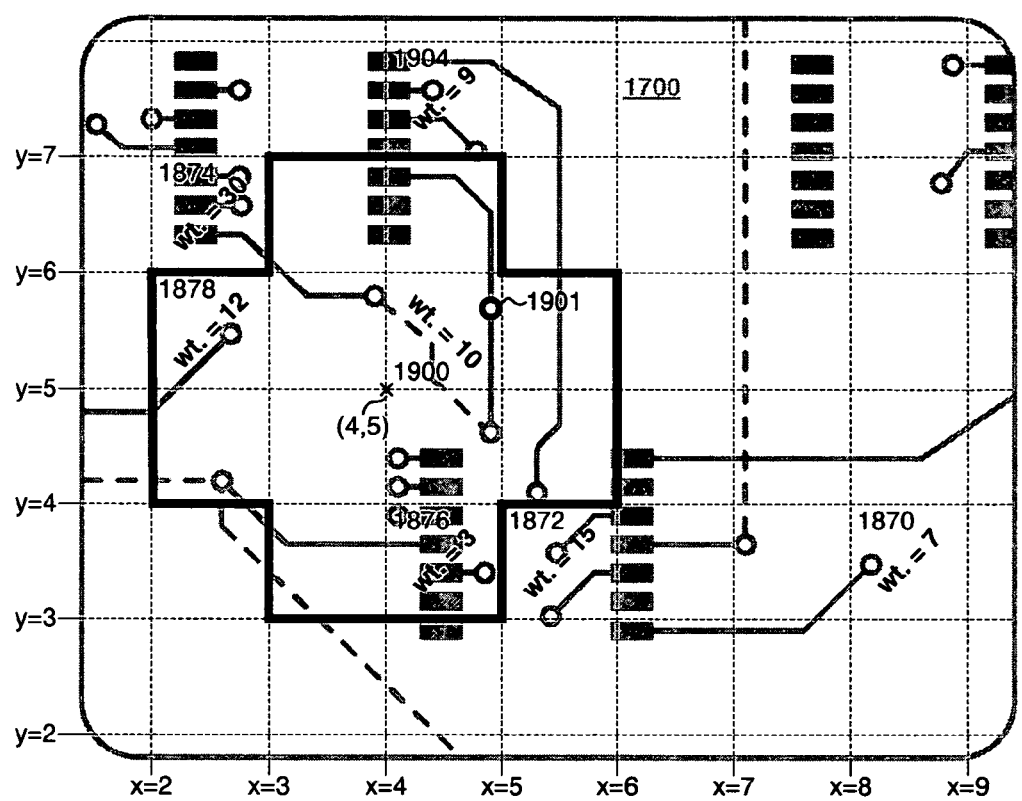
Figure 19C:
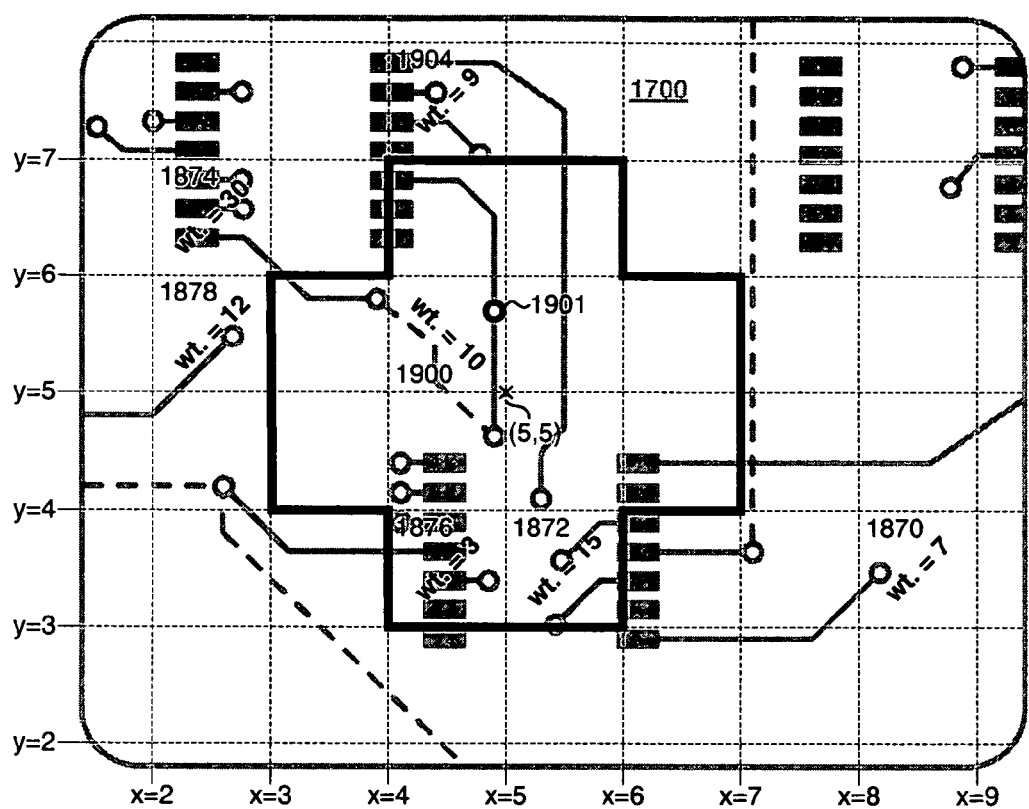
Figure 19D:
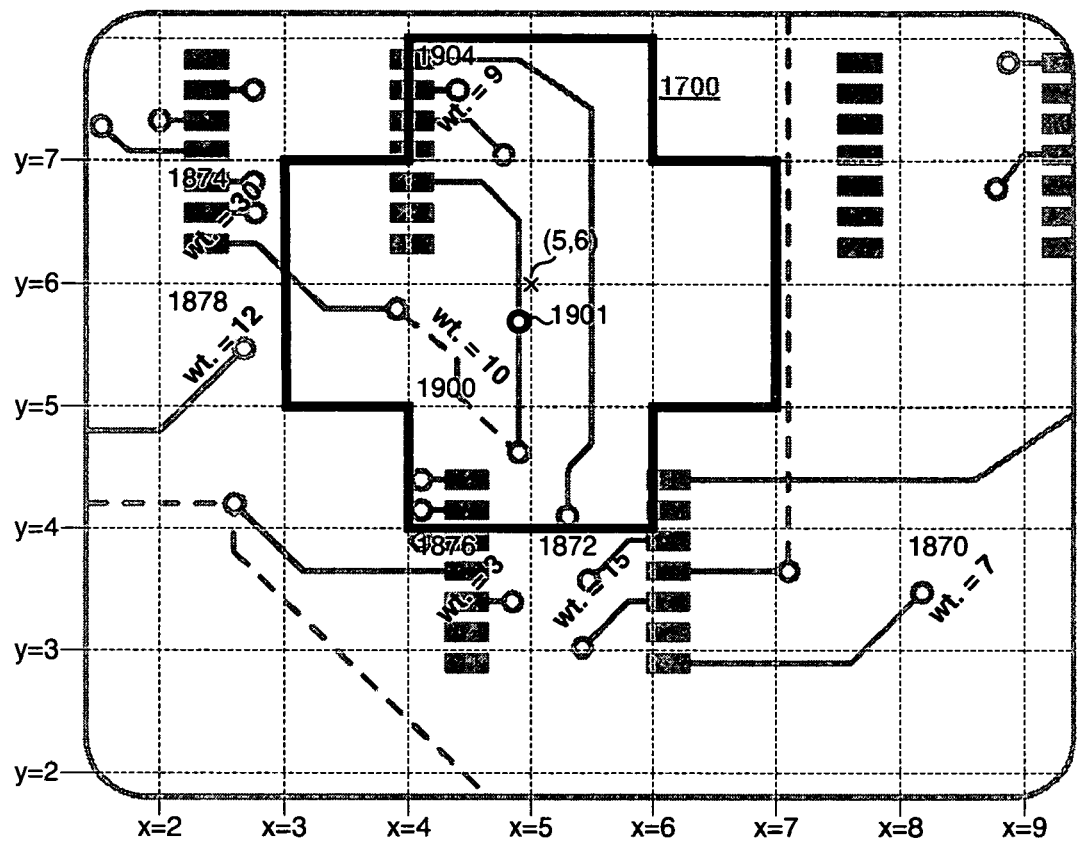
Figure 19E:
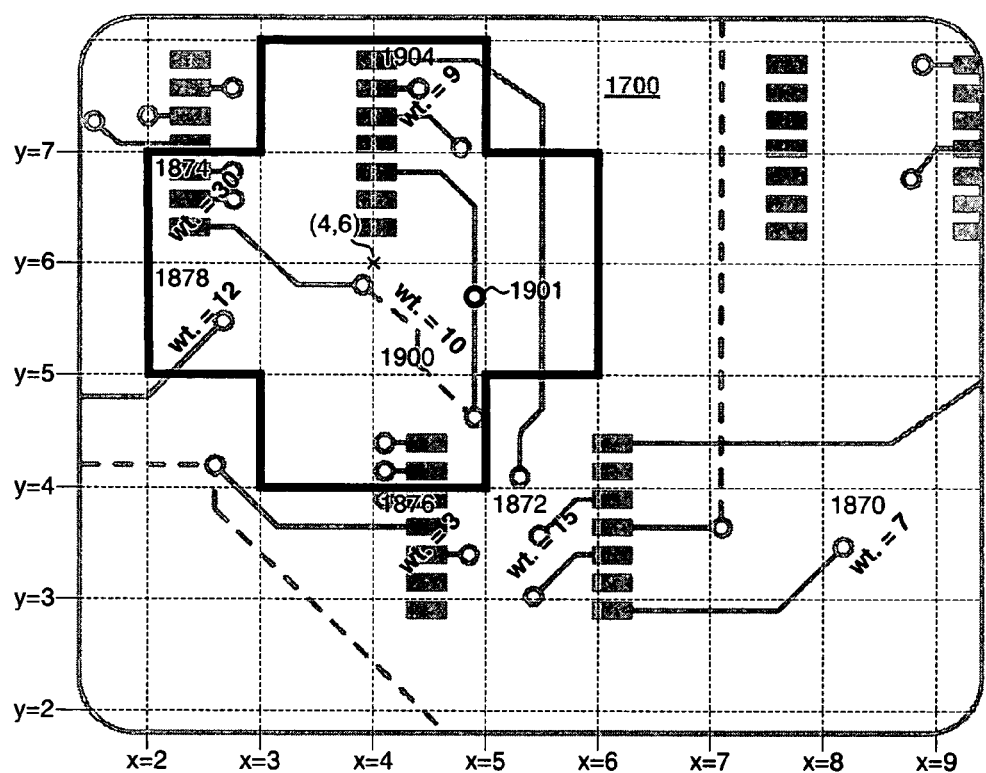
Figure 20:
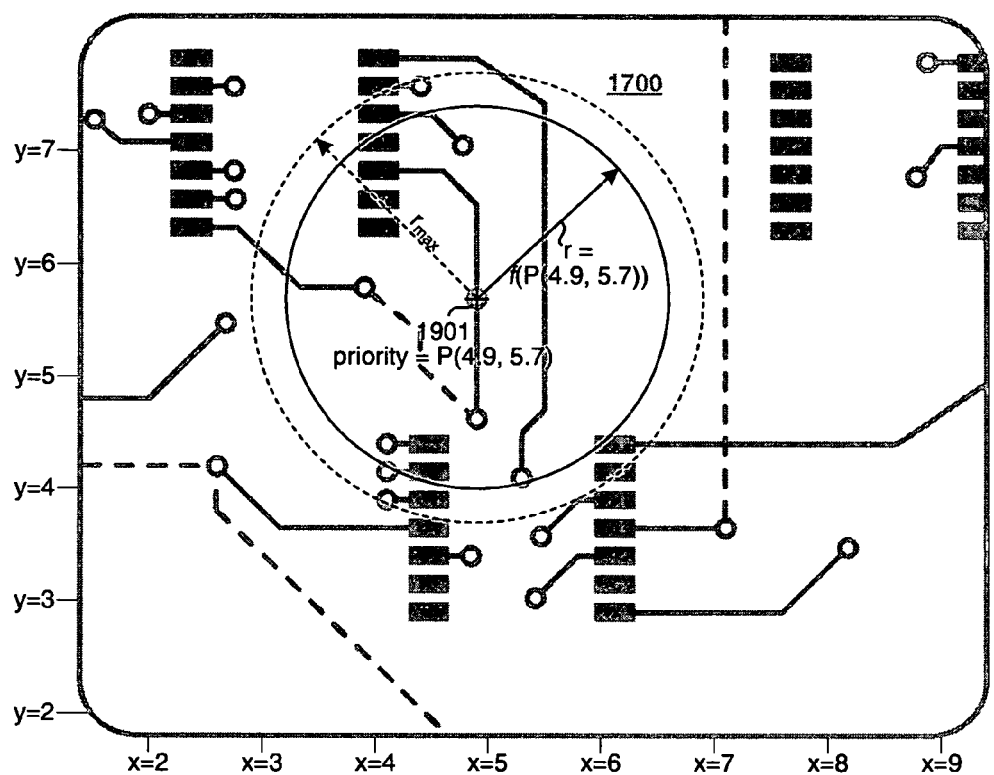
FIG. 20 shows calculation of protected zone size.

At multiple times during an editing session, the client uses the cell weights to calculate the priority and protected zone size for the user based on the current position of the user's cursor. An example calculation is demonstrated in FIGS. 19A through 20. FIGS. 19A–20 show design 1700 several time periods Δt after the time period of FIG. 18H. Based on additional object selections and/or other editing activities, in combination with decay of cell weight values over time, cells 1870, 1872, 1874, 1876, 1878 and 1904 have respective weight values of 7, 15, 30, 3, 12 and 9. Moreover, the user has also positioned the cursor within cell 1900 and added via 1901 (thereby causing cell 1900 to now have a weight of 10). For purposes of explanation, arbitrarily chosen coordinates have been added to the boundaries of the cells associated by the client with portions of design 1700. Using these coordinates, via 1901 (and currently, the user cursor) is located at (x, y) coordinate position (4.9, 5.7). After the user adds via 1901, and before the cursor moves to another location, the client calculates the priority and protected zone size for the (4.9, 5.7) location. Because protected zone size for a particular location is a function of user priority at that location (as described below), the client first calculates priority. That priority value is, in turn, calculated from cell weights surrounding the current cursor location.

In particular, the client first calculates weight sums for each of the four corners of the cell containing the cursor location (cell 1900 in the current example). As seen in FIG. 19A, those corners are located at (4, 5), (5, 5), (5, 6) and (4, 6). In FIG. 19B, the client first sums the weights of the twelve cells closest to the first corner (4,5) of cell 1900. Those cells, shown in FIG. 19B within the bold line, contain cells having weights of 12 (cell 1878), 10 (cell 1900) and 3 (cell 1876). The weight sum for corner (4,5) is thus 25. In FIG. 19C, the client next sums the weights of the twelve cells closest to corner (5,5) for a total of 28. The weight sum for corner (5,6) is 19 (shown in FIG. 19D), and the weight sum for the corner (4,6) is 61 (shown in FIG. 19E). The priority for the (4.9, 5.7) cursor position is calculated from the four corner sums using bilinear interpolation as set forth in Equation 1:

$$P(x,y)=(1-q)(1-r)W_{corner\ 1}+(q)(1-r)(W_{corner\ 2})+(q)(r)(W_{corner\ 3})+(1q)(r)(W_{corner\ 4}),$$

where P(x, y) is the priority at cursor location (x, y),
$W_{corner\ 1}$ is the sum of cell weights for the twelve cells closest to corner 1,
corner 1 is the lower left corner of the cell containing location (x, y) and has coordinates $(x_1, y_1)$,
$W_{corner\ 2}$ is the sum of cell weights for the twelve cells closest to corner 2,
corner 2 is the lower right corner of the cell containing location (x, y) and has coordinates $(x_2, y_2)$,
$W_{corner\ 3}$ is the sum of cell weights for the twelve cells closest to corner 3,
corner 3 is the upper right corner of the cell containing location (x, y) and has coordinates $(x_2, y_2)$,
$W_{corner\ 4}$ is the sum of cell weights for the twelve cells closest to corner 4,
corner 4 is the upper left corner of the cell containing location (x, y) and has coordinates $(x_1, y_2)$, $$q=(x-x_1)/(x_2-x_1),\ \text{and}$$

$$r=(y-y_1)/(y_2-y_1).$$

Using Equation 1, the priority value P(4.9,5.7) for the current cursor location is 24.55.

FIG. 20 shows an example calculation of protected zone size using the priority value. In at least some embodiments, the protected zone is a circle of radius r centered on the cursor location. The radius r of the protected zone circle is a function of the priority value for the cursor location, up to a maximum protected zone size (having radius $r_{max}$). In at least some embodiments, the maximum protected zone radius is 0.4 inches in the virtual design space. In other words, the maximum protected zone, if transferred to an actual PCB for which the PCB design is being created, would be a circle 0.8 inches in diameter. In certain embodiments, $r_{max}$ (or other dimension(s) for maximum protected zone size) is adjustable by a system administrator or other appropriate person. In at least some embodiments, the protected zone radius r for a given cursor location is proportional to the priority value for that location (up to $r_{max}$). In other words, if $P<(r_{max}/k)$, $r=(k*P)$; otherwise $r=r_{max}$. In some embodiments, the proportionality constant k is related to the maximum size of a priority value ($P_{max}$) such that $k=r_{max}/P_{max}$. In certain embodiments, $P_{max}$ is in turn related to the maximum weight which a cell value may have (255, in some embodiments). Alternatively, in some embodiments, rather than calculating r from the priority value, the priority value can be compared to a look-up table to obtain the protected zone radius r.

Figure 21:
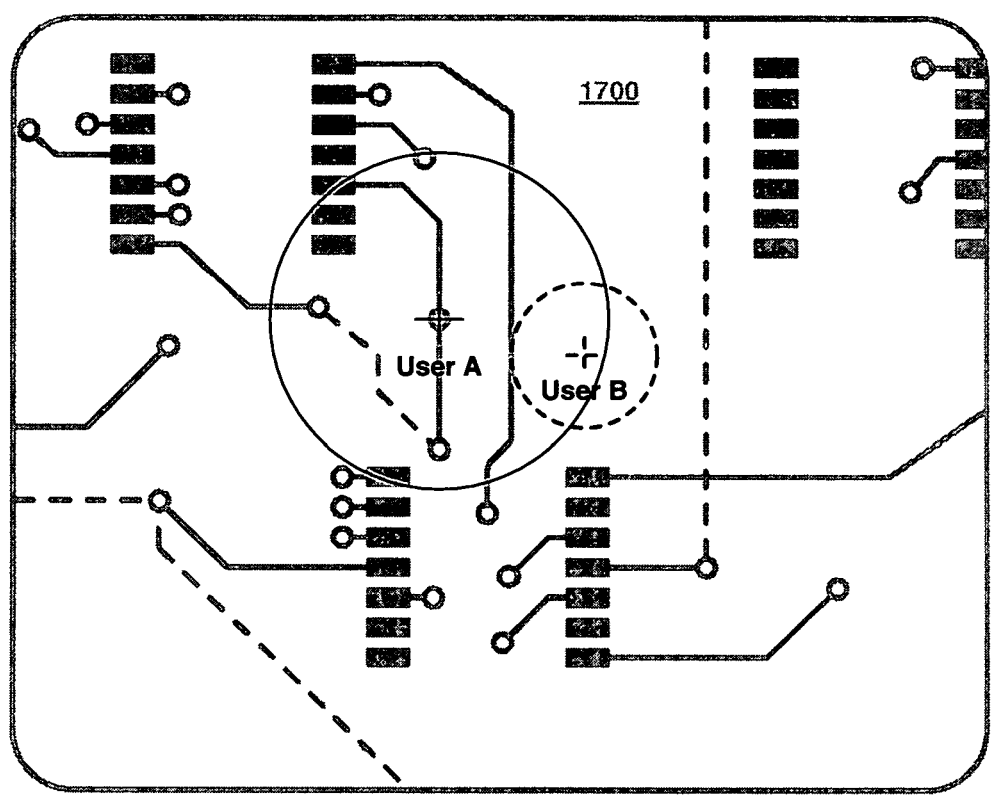
FIG. 21–23 show a change in appearance when a protected zone is at least partially within another protected zone.
Figure 22:
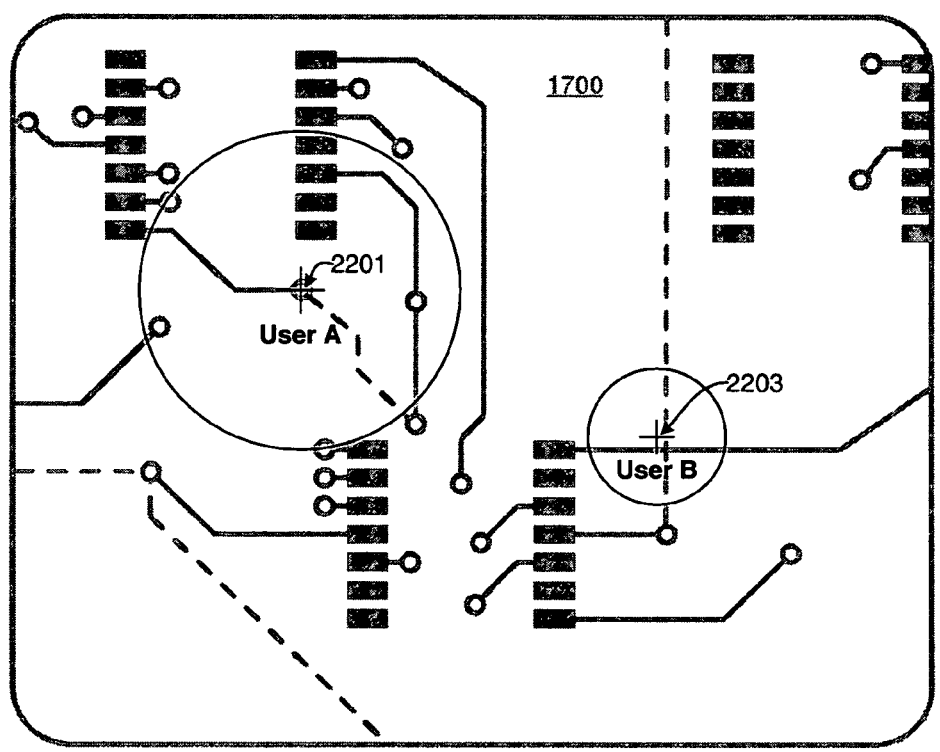
Figure 23:
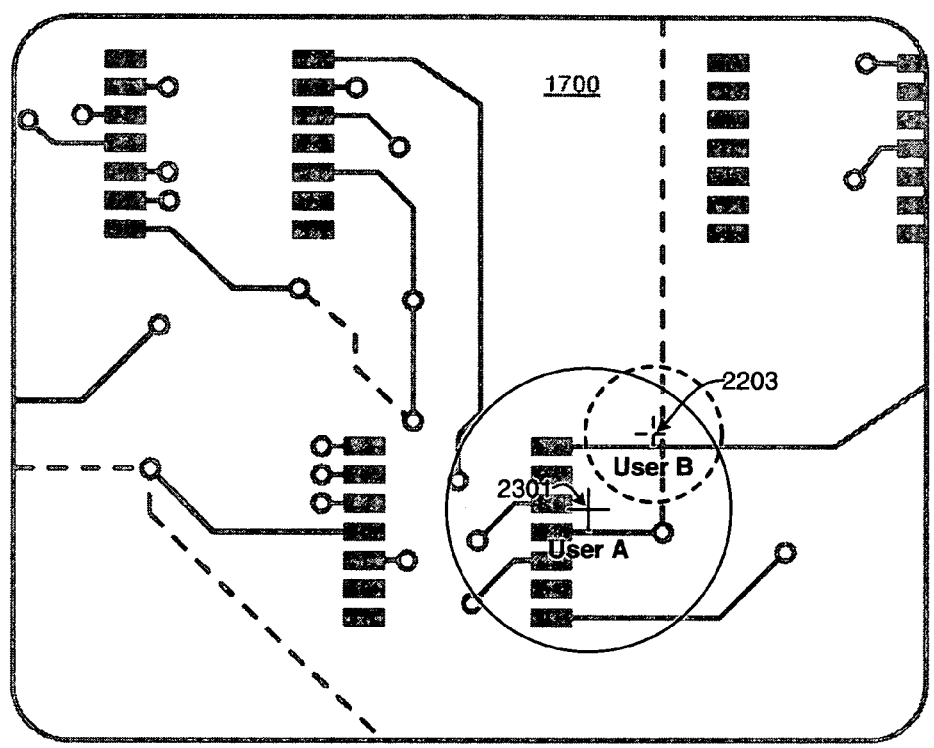

Priority values also may be used to resolve conflicts between protected zones. If the protected zones of two or more users overlap, the user with lower priority is not allowed to edit within the higher-priority user's protected zone. For example, and as shown in FIG. 21 (a display from the User B client), User B has moved his or her cursor inside of the User A protected zone. The protected zone circle and cursor for User B change color (shown as a dashed line in the drawing) to indicate that User B has moved into an area in which User B cannot edit. A similar situation is shown in FIGS. 22 and 23 (also displays from the User B client). In FIG. 22, the User A cursor is at position 2201 and the User B cursor is at position to position 2203. In FIG. 23, the User A cursor has moved to position 2301, while the User B cursor has remained at position 2203. Because the priority of User A at position 2301 is higher than the priority of User B at position 2203, User B is no longer permitted to edit at position 2203. Accordingly, the protected zone circle and cursor for User B change color to notify User B of this condition. In some embodiments, as noted above, a higher priority user is advised of edit attempts by a lower priority user within the higher priority user's protected zone. The higher priority user may then be queried whether edit attempts by the lower priority user should be permitted. In still other embodiments, a higher priority user may grant edit rights to certain other users if those other users attempt to edit in the protected zone of the higher priority user.

Each client calculates its priority and protected zone size, and periodically transmits these values to the server with the current cursor location on that client. The server monitors the cursor location, priority and protected zone size for each client. If a user at one client attempts to edit a portion of the design inside the protected zone of a user at another client, the server determines the relative priorities and decides whether the edit is permitted. If permitted, the edit request is processed as described above (e.g., check for design rule violations, accepted or rejected, etc.). If rejected, the user attempting the edit is notified.

So as to provide a clearer explanation of priority and protected zone size calculations, the example of FIGS. 18A–20 only shows such calculations made for a single cursor position. In many embodiments, however, the priority and protected zone would be calculated for numerous locations. In some embodiments, a client only determines priority and protected zone size and transmits those values when a user performs an editing operation requiring a mouse click. In other words, if a user moves his or her cursor to a new location without clicking the mouse button while in the new location, a protected zone and priority for the new location would not be calculated. In other embodiments, the client calculates and sends the priority value and protected zone size whenever the cursor comes to rest in a new position, without regard to whether the user has selected a design object in the new position. In still other embodiments, the client calculates and sends the priority and protected zone size at periodic intervals (e.g., every 500 milliseconds). In still other embodiments, priority update timing is varied so as to reflect network latency. For example, a client could send a priority update as soon as it receives a confirmation that a previous update was delivered to the server. The update interval would thus be equal to the network round trip delay.

Although the preceding description provides several examples of manners by which user protected zones may be implemented, numerous variations are within the scope of the invention. As indicated above, cell weights can be increased whenever a user selects an object (or location) in a PCB design by clicking or double-clicking a mouse button. Thus, in addition to adding a new design object to a location, selecting an object for deletion, moving an object or selecting an object (without further action) can likewise increase cell weight. The triggering events for increasing cell weight can be defined in other ways (e.g., only when a new object added, only when an object added or moved, etc.). In the above-described embodiments, each client associates a cell array with the PCB design and tracks cell weights based on the activity of the user working at that client. However, the cells and cell weights for each user could be maintained by the server, or by one client for several other clients. Similarly, the priority and protected zone calculations could be performed by the server or by one client for several clients. The priority and protected zone for a cursor location could apply to all layers of a design or to less than all layers. For example, a first user could have highest priority in an (x, y) location on a first layer, and another user could have highest priority in the same (x, y) location within a second layer. In at least one embodiment, the weight for each cell is limited to 255 so that a single byte may contain the weight value. If there is activity inside the cell that would otherwise result in a weight value exceeding 255, the weight value is capped at 255. Of course, different size memory locations could be used to store weight values.

In the previous examples, the server tracks cursor location, protected zone size and priority for each user based on information received from the clients. Using this information, the server then permits or refuses edit requests within a protected zone. In other embodiments, one or more clients permit or refuse edit requests within a protected zone. When a user working at a client attempts to edit inside the protected zone of another user (working at another client), the client refuses (i.e., does not permit) the edit. In this manner, the client need not transmit an edit request to the server.

Figure 24:
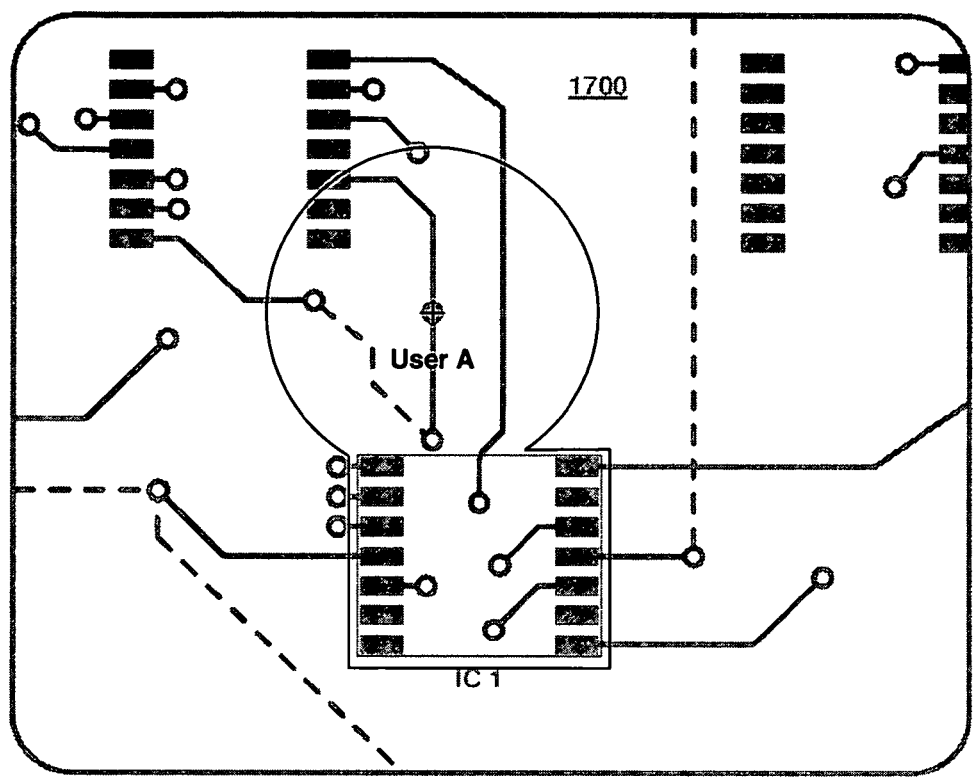
FIG. 24 shows a protected zone according to at least some additional embodiments of the invention.

Various parameters and other aspects could also be modified. For example, each cell could be incremented by 5 or some other value for every object selection or other triggering event within the cell. Moreover, cell weights could be increased by different amounts for different types of actions, for actions by certain users and/or for actions when performing certain types of design tasks. Similarly, cell weights can be decreased using other decay rates or using other decay algorithms. In some embodiments, the protected zone for a user having a higher priority than another user who drew a protection border (FIG. 7) or locked an object (discussed below) overrides the protection boundary or locked object. In still other embodiments, the protected zone for a user automatically expands to include objects straddling the protected zone boundary, as shown in FIG. 24. In FIG. 24, the boundary for the User A protected zone straddles IC1. Accordingly, the protected zone expands to include IC1, and lower priority users are prevented from editing IC1.

As indicated above, object locking is another mechanism that can be used for conflict prevention. Object locking entails marking one or more discrete design objects as reserved for the client that performs the locking operation and not editable by other clients. In some embodiments, the user setting the lock can give access permissions to other users. Still another mechanism that can be used for conflict prevention is the assignment of netlines to autorouters. Assigning netlines to autorouters prevents one autorouter from routing the same netline differently.

Distributed PCB Design

Figure 9:
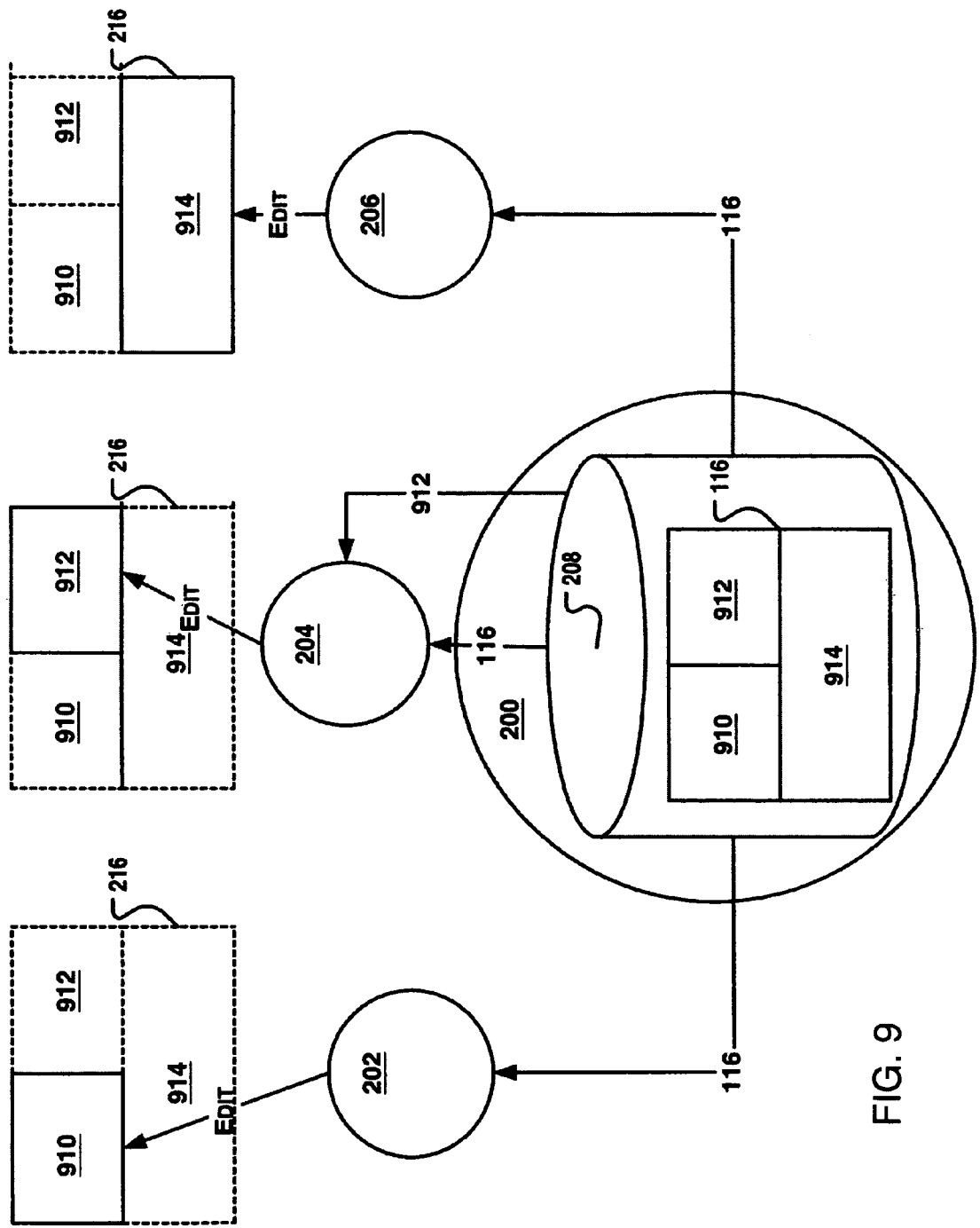
FIG. 9 is a block diagram illustrating a second embodiment of the invention, where parallel access is implemented by giving users editing access to corresponding areas of a master design, and read-only access to other areas of the master design.

FIG. 9 is a block diagram of a distributed editing system in accordance with another embodiment of the invention. The system comprises a plurality of clients 202, 204, 206, and a server 200 having a database 208 to store the master design 116. The master design comprises exclusive areas 910, 912, 914, where each exclusive area 910, 912, 914 may be viewed by all users, but edited by a single user.

Like prior art systems, each user is assigned a unique piece 910, 912, 914 of the master design 116 to work on. However, unlike prior art systems, a user can view the edits to the other pieces of the design being performed by other users concurrently with the user's editing session. For example, exclusive area 910 may correspond to a user on client 202, such that user on client 202 may edit exclusive area 910. User on client 202 is able to edit exclusive area 910, and is also able to view exclusive areas 912, 914 to view the compiled master design.

Partitioning

Partitioning is the process whereby a design is segregated into a plurality of areas. Partitioned areas may then be assigned to users, such that only an assigned user may edit that area. An exclusive area, with respect to a given user who is assigned to the exclusive area, can only be edited by the given user. The exclusive area with respect to any other user can only be viewed (i.e., is read-only) by other users. In certain embodiments, access rights can be defined so that a portion of a design is exclusive as to a group of users (e.g., the exclusive area is a shared area as to that user group). In other words, certain users may edit within that portion and other users may not.

The area boundaries may be arbitrary, and are not bound to the schematic boundaries. Partitioning may be performed by specific drawing tools that create polygons and can assign attributes such as a name, an owner, etc. to each exclusive area.

Figure 10:
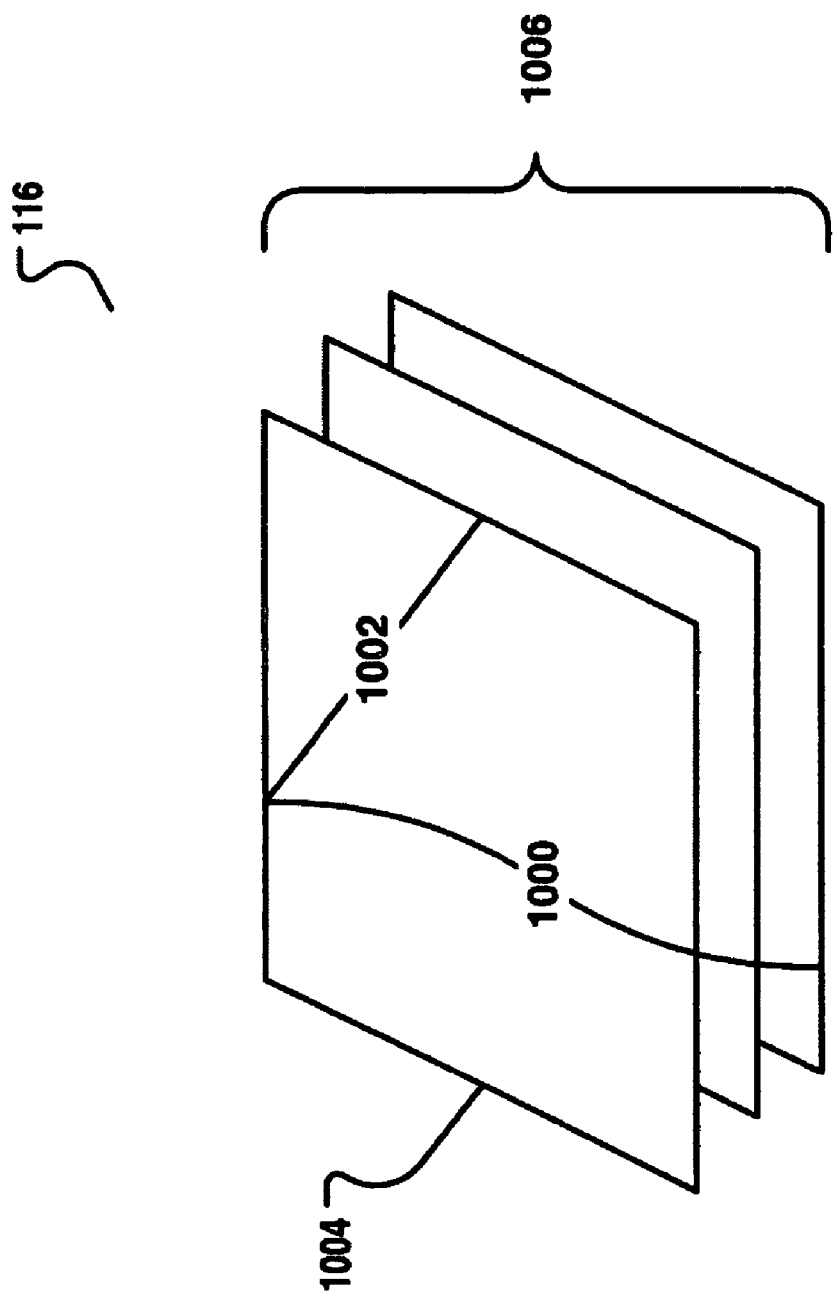
FIG. 10 is a block diagram illustrating partitioning.

In embodiments of the invention, an owner of a design partitions a design into a plurality of sections. For example, as illustrated in FIG. 10, arcs 1000 and lines 1002 may be used to partition a single layer 1004 of the design 116, or even multiple layers 1006 of the design 116. Sections may be defined by specifying a type of area (i.e., circle, rectangle, polygon); assigning one or more layers to the area; and assigning the section. Each section is then available for editing by a single user. An owner of a design may also be a user.

When a section is assigned to a user or group of users, the section becomes an exclusive area. An exclusive area is not available for editing by other users not within the assignee group, but is available for viewing by those non-assignee users. An exclusive area may be explicitly assigned whereby the owner of the design specifically assigns a given area to a specific user, or an exclusive area may be implicitly assigned whereby any area that is not explicitly assigned is assigned to the owner of the design by default. Alternatively, each area may be assigned an arbitrary name, and users may reserve areas by checking out exclusive areas on demand.

For purposes of illustration, it is assumed that the whole board is exclusive such that users on the clients 202, 204, 206 can simultaneously edit in assigned areas while viewing the compiled master design 116, subject to access rights, discussed supra. It is also contemplated that exclusive areas may comprise a subset of areas on a master design 116, such that the master design 116 comprises shared and exclusive areas. In this latter scenario, edits to the master design 116 in exclusive areas are validated by a corresponding client conflict checking and resolution module; and edits to the master design 116 in shared areas may be validated by a corresponding client conflict checking and resolution module, a server conflict checking and resolution module, or both.

Editing

Figure 11:
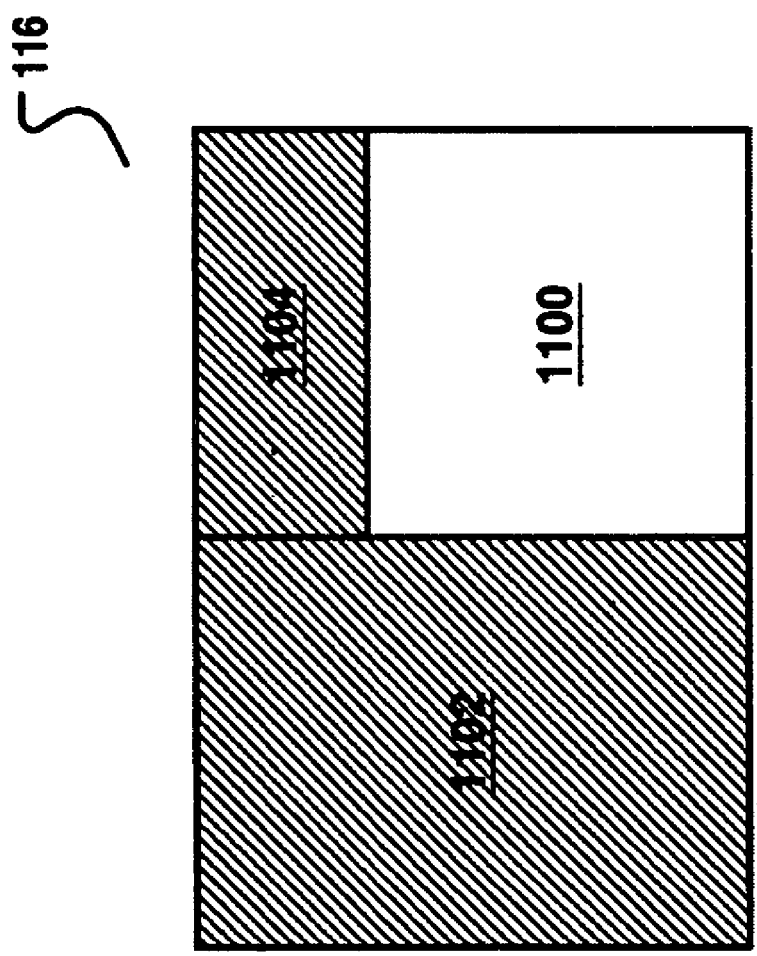
FIG. 11 is a block diagram illustrating a partitioned master design.

As illustrated in FIG. 11, when a user opens a design 116, all sections corresponding to the user 1100 (i.e., exclusive areas that are assigned to or checked out by the user), as well as shared areas, if any, are available to the user for editing, and all other non-corresponding, exclusive areas 1102, 1104 are available for viewing. In embodiments of the invention, the user may be given an option to display only the parts and routes inside the exclusive areas for the specified user. Other items such as PCB objects, drawing objects, and netlines can be displayed normally.

Any objects inside a corresponding exclusive area are available for editing, and any objects outside of a corresponding exclusive area are locked and not available for editing, but are read-only. Objects include but are not limited to routes, components, traces, vias, text, and drawing objects, for example.

Placement Rules

Placement and clearance rules help prevent conflicts that may arise during design of a section. For example, since exclusive areas may have layer restrictions, it is possible for a component, a via, a thruhole pin, or a part to exist in multiple exclusive areas. Any object that exists in multiple areas should be locked. An object that would traverse multiple areas (by existing on multiple layers that are assigned to different users) should be prevented from being added.

Figure 12:
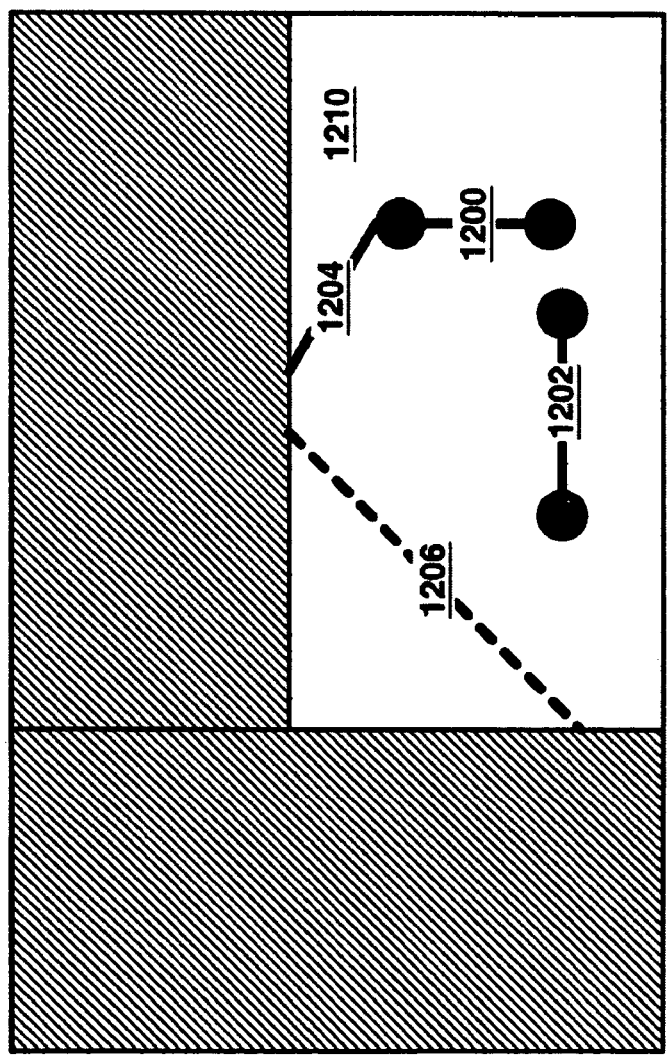
FIG. 12 is a block diagram illustrating netline connectivity when partitioning is implemented.

Furthermore, as illustrated in FIG. 12 (assuming area 1210 is an exclusive area), netlines 1200, 1202 that start inside an exclusive area, and finish inside an exclusive area may be completely routed; netlines 1204 that start inside an exclusive area, but that finish outside the exclusive area may be routed to the edge of the exclusive area. Once the netline is routed to the edge of one exclusive area, the owner of the adjacent exclusive area (or any user, if it is a shared area) may continue routing the netline in their own area. Netlines 1206 that do not start or end in an exclusive area may be restricted from routing, or may be routed with limitations. In this example, netline 1206 may be routed if its endpoints are on the edge of the exclusive area.

Figure 13:
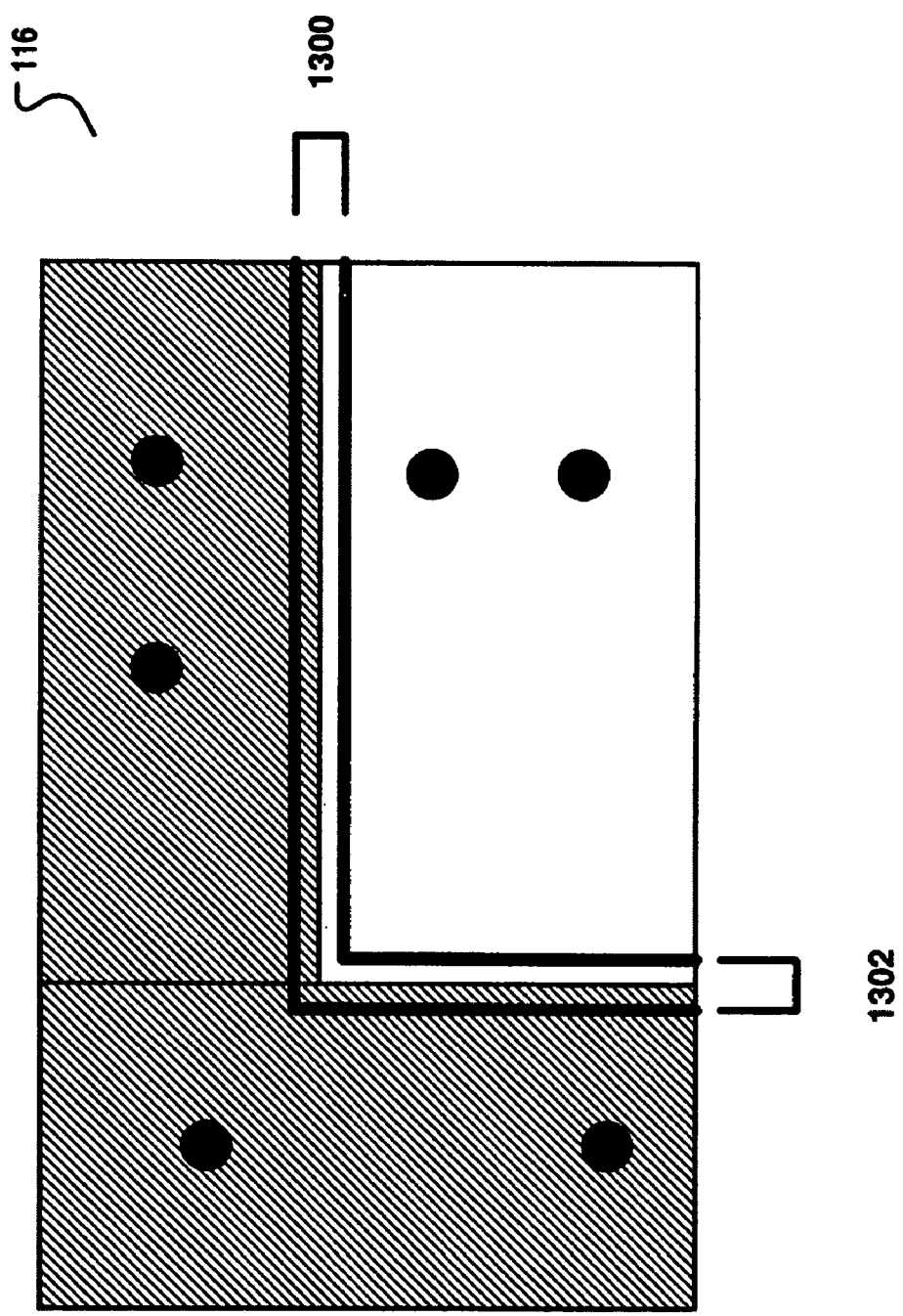
FIG. 13 is a block diagram illustrating the use of force field widths in netline connectivity.

Spacing violations may occur when traces are placed too closely to one another. (See Conflict Checking and Resolution, discussed supra.) Spacing violations are likely to occur along the boundary of two sections, or within an exclusive area. As illustrated in FIG. 13, one way to deal with spacing violations that occur along the boundary of two sections, is to allow force field widths 1300, 1302 (discussed, supra) along the boundaries. Force field widths automatically provide a reasonable clearance between objects along the boundaries, and allow users to design to the edge of an exclusive area without facing potential spacing violations.

There are various other possibilities for placement and clearance rules that are well known in the art and are not further discussed herein. The examples provided are for illustrative purposes only and are not intended to be limiting on embodiments of the invention.

Flowcharts

Figure 14:
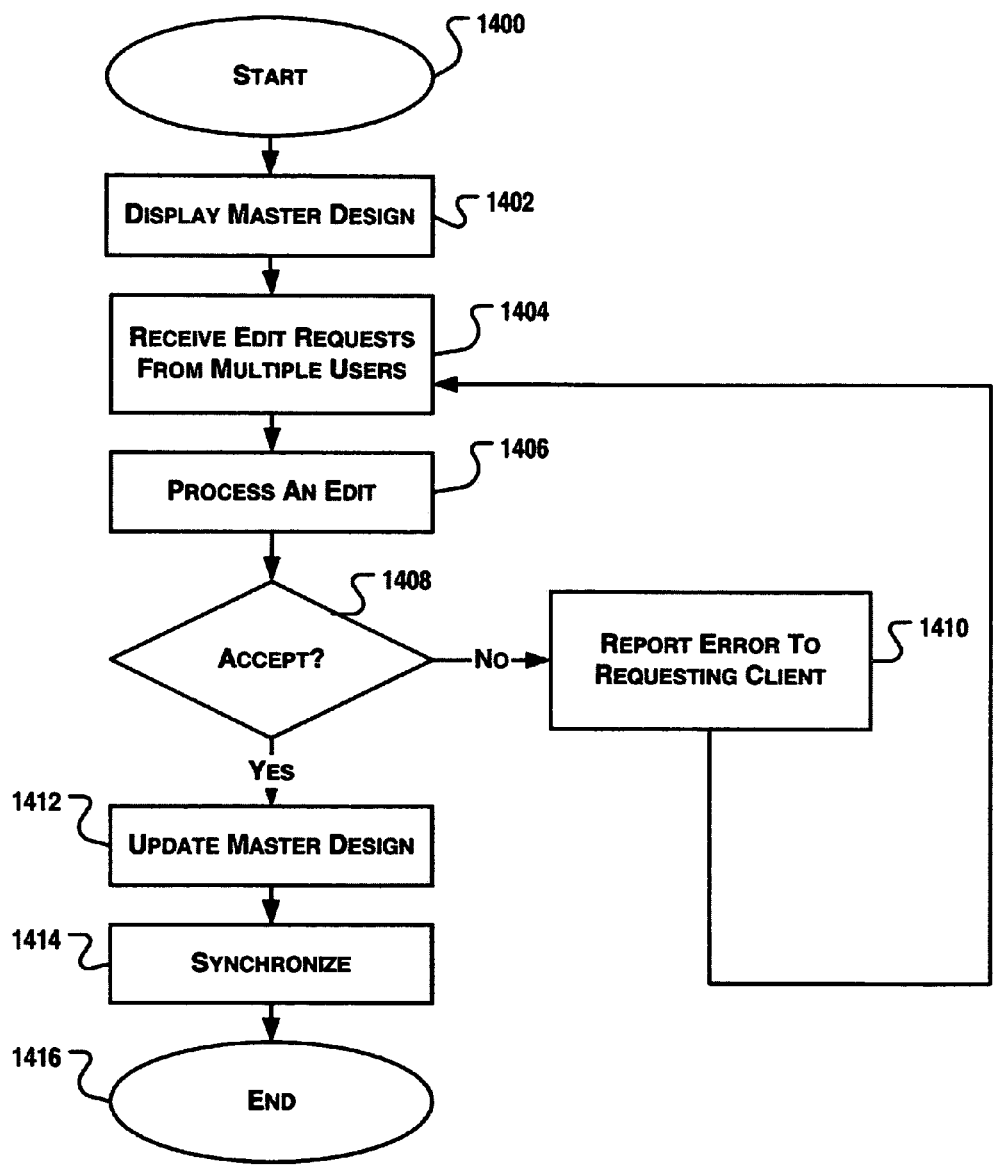
FIG. 14 is a flowchart illustrating a method in accordance with general embodiments of the invention.

FIG. 14 is a flowchart illustrating a method in accordance with general embodiments of the invention as discussed above. It begins at block 1400 and continues to block 1402 where a master design is displayed to a plurality of clients. In one embodiment, each client views the master design from the server database. In another embodiment, each client maintains a copy of the master design in the client's own memory space.

At block 1404, one or more edit requests are received from multiple users. At block 1406, a given edit request is processed. In one embodiment, an edit request is processed by subjecting the edit request to client conflict checking and resolution, prior to submitting the edit request to the server for server conflict checking and resolution, if needed. In another embodiment, the edit request is directly submitted to the server for server conflict checking and resolution.

At block 1408, it is determined if the edit request has been accepted. If the edit request passes conflict checking and resolution, then it is accepted. Otherwise, the edit request is rejected. If the edit request is accepted, then at block 1412, the master design is updated, and clients are synchronized with master design at block 1414. If the edit request is rejected, it is reported as an error to the appropriate client at block 1410. The method ends at block 1416.

Conclusion

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

For example, a master design 116 may be partitioned into areas, and the areas may then be designated as shared or exclusive, such that both shared and exclusive areas comprise sections. The protected zones described in connection with FIGS. 17–24 can be implemented in connection with shared areas (including areas shared by a designated user group) of a master design partitioned into shared and exclusive areas.

The invention claimed is:

1. A method for editing a printed circuit board design, comprising:

receiving design data at each of first and second clients, wherein
the design data includes graphically displayable information regarding a pattern of electronic components and connections between those components for at least a portion of the design,
the design data includes data corresponding to at least a portion of a shared area of the design, and
the shared area is simultaneously editable by both of the clients;
generating a first boundary associated with a part of the shared area being edited at the first client;
displaying the first boundary, at the second client, as a collection of points separating one region of a graphical display of the pattern of electronec components and connections from another region of said graphically displated pattern; and
preventing the second client from editing parts of the shared area within the first boundary.

2. The method of claim 1, wherein:
said generating a first boundary comprises generating the first boundary at the first client, and
said preventing the second client from editing comprises rejecting at the second client a request to edit a portion of the shared area within the first boundary.

3. The method of claim 1, fUrther comprising transmitting an edit request from the second client to a server, and wherein:
the edit request includes a request to edit a portion of the shared area within the first boundary, and
said preventing the second client from editing comprises receiving at the second client notification that the server has rejected the edit request.

4. The method of claim 1, wherein the first boundary defines an area around a location of a first cursor, said first cursor being controlled at the first client.

5. The method of claim 4, further comprising:
increasing the size of the first boundary based on editing activity within the shared area performed at the first client.

6. The method of claim 1, further comprising:
displaying at the second client an identifier associating the first boundary with at least one of the first client and a user editing the shared area from the first client.

7. A method for editing a printed circuit board design, comprising:
receiving design data at each of first and second clients, wherein
the design data includes graphically displayable information regarding a pattern of electronic components and connections between those components for a least a portion of the design,
the design data includes data corresponding to a least a portion of a shared area of the design, and
the shared area is simultaneously editable by both of the clients;
associating each of a first plurality of sections of the shared area with a respective one of a first plurality of weight values;
changing weight values of the first plurality of weight values based on editing activity at the first client, said editing activity pertaining to the shared area sections associated with the changed weight;
generating a first boundary associated with a part of the shared area being edited at the first client, said generating the first boundary including determining a size of the first boundary based on at least some of the weight values;
displaying the first boundary at the second client; and
preventing the second client from editing parts of the shared area within the first boundary.

8. The method of claim 7, further comprising:
changing individual weight values of the first plurality of weight values as a function of time.

9. The method of claim 7, wherein:
the first boundary defines a region around a location of a first cursor, said first cursor being controlled at the first client, and said generating the first boundary comprises determining a size of the first boundary based on the weight values associated with sections of the first plurality of shared area sections within a predefined range of the first cursor location.

10. The method of claim 7, further comprising:
associating each of a second plurality of sections of the shared area with a respective one of a second plurality of weight values;
changing weight values of the second plurality of weight values based on editing activity at the second client, said second client editing activity pertaining to the shared area sections associated with the changed weight values of the second plurality of weight values;
generating a second boundary associated with a part of the shared area being edited at the second client, wherein
the second boundary defines a region around a location of a second cursor, said second cursor being controlled at the second client, and
said generating the second boundary comprises determining a size of the second boundary based on the weight values associated with sections of the second plurality of shared area sections within a predefined range of the second cursor location;
displaying the second boundary at the first client; and
preventing the first client from editing a portion of the shared area within the second boundary.

11. The method of claim 10, further comprising:
determining, prior to said step of preventing the first client from editing, a lower first client priority relative to a second client priority.

12. The method of claim 11, wherein:
the priority of the first client is based on the weight values associated with sections of the first plurality of shared area sections within a predefined range of the first cursor location, and
the priority of the second client is based on the weight values associated with sections of the second plurality of shared area sections within a predefined range of the second cursor location.

13. The method of claim 10, further comprising:
displaying the first and second cursor positions at each of the first and second clients; and
changing the manner in which at least one of the first cursor and the first boundary is displayed at the first client when the first cursor is within the region defined by the second boundary.

14. The method of claim 1, further comprising:
enlarging the first boundary to include an object partially inside and partially outside the first boundary.

15. A method for editing design data for a printed circuit board, comprising:
transmitting the design data to each of first and second clients, wherein
the design data includes graphically displayable information regarding a pattern of electronic components and connections between those components for at least a portion of the design,
the design data includes data corresponding to at least a portion of a shared area of the design, and
the shared area is simultaneously editable by both of the clients;
receiving data describing a first boundary associated with a part of the shared area being edited at the first client;
transmitting the data describing the first boundary to the second client for display thereon as a collection of points separating one region of a graphical display of the pattern of electronic components and connections from another region of said graphically displayed pattern; and
preventing the second client from editing parts of the shared area within the first boundary.

16. The method of claim 15, wherein said preventing the second client from editing comprises rejecting a request received from the second client to edit a portion of the shared area within the first boundary.

17. The method of claim 15, wherein the first boundary defines an area around a location of a first cursor, said first cursor being controlled at the first client.

18. The method of claim 17, further comprising:
receiving additional data describing a changed size of the first boundary based on editing activity within the shared area performed at the first client.

19. The method of claim 15, further comprising:
transmitting for display at the second client an identifier associating the first boundary with at least one of the first client and a user editing the shared area from the first client.

20. A method for editing design data for a printed circuit board, comprising;
transmitting the design data to each of first and second clients, wherein
the design data includes graphically desplayable information regarding a pattern of electronic components and connections berween those components for at least a portion of the design,
the design data includes data corresponeing to at least a portion of a shared area of the design, and
the shared area is simultaneously editable by both of the clients;
receiving data describing a first boundary associated with a part of the shared area being edited at the first client;
transmitting the data describing the first boundary to the second client for display thereon;
preventing the second client from editing parts of the shared area within the first boundary:
associating each of a first plurality of sections of the shared area with a respective one of a first plurality of weight values; and
changing weight values of the first plurality of weight values based on editing activity at the first client, said editing activity pertaining to the shared area sections associated with the changed weight values, and wherein a size of the first boundary is based on at least some of the weight values.

21. The method of claim 20, further comprising:
changing individual weight values of the first plurality of weight values as a function of time.

22. The method of claim 20, wherein:
the first boundary defines a region around a location of a first cursor, the first cursor being controlled at the first client, and
the size of the first boundary is based on the weight values associated with sections of the first plurality of shared area sections within a predefined range of the first cursor location.

23. The method of claim 20, further comprising:
associating each of a second plurality of sections of the shared area with a respective one of a second plurality of weight values;
changing weight values of the second plurality of weight values based on editing activity at the second client, said editing activity pertaining to the shared area sections associated with the changed weight values of the second plurality of weight values;
receiving data describing a second boundary associated with a part of the shared area being edited at the second client, wherein
the second boundary defines a region around a location of a second cursor, the second cursor being controlled at the second client, and
a size of the second boundary is based on the weight values associated with sections of the second plurality of shared area sections within a predefined range of the second cursor location;
transmitting the data describing the second boundary to the first client for display thereon; and
preventing the first client from editing parts of the shared area within the second boundary.

24. The method of claim 23, further comprising:
determining, prior to said step of preventing the first client from editing, a lower first client priority relative to a second client priority.

25. The method of claim 24, wherein:
the priority of the first client is based on the weight values associated with sections of the first plurality of shared area sections within a predefined range of the first cursor location, and
the priority of the second client is based on the weight values associated with sections of the second plurality of shared area sections within a predefined range of the second cursor location.

26. A method for editing a printed circuit board design, comprising:
displaying design data at a first client, wherein
the design data includes graphically displayable information regarding a pattern of electronic components and connections between those components for at least a portion of the design,
the design data includes data corresponding to at least a portion of a shared area of the design, and
the shared area is simultaneously editable by the first client and a second client;
generating a first boundary associated with a part of the shared area being edited at the first client, said first boundary defining a region of the shared area protected from editing by the second client, said first boundary displayable at the second client as a collection points separating one region of a graphical display of the pattern of electronic components and connections from another region of said graphically displayed pattern; and transmitting data regarding the first boundary for display at the second client.

27. The method of claim 26 further comprising:
displaying at the first client a second boundary associated with a part of the shared area being edited at the second client, said second boundary defining a region of the shared area protected from editing by the first client.

28. The method of claim 27, further comprising:
increasing a size of the first boundary based on editing activity at the first client;
transmitting data regarding the increased first boundary size for display at the second client; and
receiving data regarding an increased size of the second boundary, said increase in the second boundary size being based on editing activity at the second client.

29. A method for editing a printed circuit board design, comprising:
displaying design data at a first client, wherein
the design data includes graphically displayable information regarding a pattern of electronic components and connections between those components for at least a portion of the design,
the design data includes data corresponding to at least a portion of a shared area of the design, and
the shared area is simultaneously editable by the first client and a second client;
generating a first boundary associated with a part of the shared area being edited at the first client, said first boundary defining a region of the shared area protected form edition by the second client;
transmitting data regarding the first boundary associated with a part of the shared area
displaying at the first client a second boundary associated withe a part of the shared area being edeted at the second client, said second boundary defining a region of the shared area protected from editing by the first client, and wherein
the first boundary defines an area around a location of a first cursor, said first cursor being controlled at the first client, and
the second boundary defines an area around a location of a second cursor, said second cursor being controlled at the second client.

30. A tangible computer program product having stored thereon data representing sequences of instructions which, when executed by a processor, cause the processor to perform steps comprising:
receiving printed circuit board design data at each of first and second clients, wherein
the design data includes graphically displayable information regarding a pattern of electronic components and connections between those components for at least a portion of the design,
the design data includes data correspondeng to at least aportion of a shared area of the design, and
the shared area is simultaneously editable by both of the clients;
generating a first boundary associated with a part of the shared area edited at the first client;
displaying the first boundary, at the second client, as a collection of points separating one region of a graphical display of the pattern of electronic components and connections from another region of said graphically displayed pattern; and
preventing the second client from editing parts of the shared area within the first boundary.

31. The tangible computer program product of claim 30, wherein:
said generating a first boundary comprises generating the first boundary at the first client, and
said preventing the second client from editing comprises rejecting at the second client a request to edit a portion of the shared area within the first boundary.

32. The tangible computer program product of claim 30, comprising further instructions for performing steps comprising transmitting an edit request from the second client to a server, and wherein:
the edit request includes a request to edit a portion of the shared area within the first boundary, and
said preventing the second client from editing comprises receiving at the second client notification that the server has rejected the edit request.

33. The tangible computer program product of claim 30, wherein the first boundary defines an area around a location of a first cursor, said first cursor being controlled at the first client.

34. The tangible computer program product of claim 33, comprising further instructions for performing steps comprising: increasing the size of the first boundary based on editing activity within the shared area performed at the first client.

35. The tangible computer program product of claim 30, comprising further instructions for performing steps comprising:
displaying at the second client an identifier associating the first boundary with at least one of the first client and a user editing the shared area from the first client.

36. The tangible computer program product of claim 30, comprising further instructions for performing steps comprising:
enlarging the first boundary to include an object partially inside and partially outside the first boundary.

37. A tangible computer program product having stored thereon data representing sequences of instruction which, when executed by a processor, cause the processor to preform steps comprising:
receiving printed circuit board design data at each of first and sedond client, wherein
the design data includes graphically displayable information regarding a pattern of electronic components and connections between those components for at least a portion of the design,
the design data inlcudes data corresponding to at least a portion of a shared area of the design, and
the shared area is simultaneously editable by both of the clients;
associating each of a first plurality of sections of the shared area with a respective one of a first plurality of weight values;
changing weight values of the first plurality of weight values based on editing activity at the first client, said editing activity pertaining to the shared area sections associated with the changed weight value;
generating a first boundary associated with a part of the shared area beig edited at the first client, said generating the first boundary icluding determining a size of the first boundary based on at least some of the weight;
displyig the first boundary at the second client; and
preventing the second client from editing parts of the shared area within the first boundary.

38. The tangible computer program product of claim 37, comprising further instructions for performing steps comprising:
    changing individual weight values of the first plurality of weight values as a function of time.

39. The tangible computer program product of claim 37, wherein:
    the first boundary defines a region around a location of a first cursor, said first cursor being controlled at the first client, and
    said generating the first boundary comprises determining a size of the first boundary based on the weight values associated with sections of the first plurality of shared area sections within a predefined range of the first cursor location.

40. The tangible computer program product of claim 37, comprising further instructions for performing steps comprising:
    associating each of a second plurality of sections of the shared area with a respective one of a second plurality of weight values;
    changing weight values of the second plurality of weight values based on editing activity at the second client, said second client editing activity pertaining to the shared area sections associated with the changed weight values of the second plurality of weight values;
    generating a second boundary associated with a part of the shared area being edited at the second client, wherein
        the second boundary defines a region around a location of a second cursor, said second cursor being controlled at the second client, and
        said generating the second boundary comprises determining a size of the second boundary based on the weight values associated with sections of the second plurality of shared area sections within a predefined range of the second cursor location;
    displaying the second boundary at the first client; and
    preventing the first client from editing a portion of the shared area within the second boundary.

41. The tangible computer program product of claim 40, comprising further instructions for performing steps comprising:
    determining, prior to said step of preventing the first client from editing, a lower first client priority relative to a second client priority.

42. The tangible computer program product of claim 41, wherein:
    the priority of the first client is based on the weight values associated with sections of the first plurality of shared area sections within a predefined range of the first cursor location, and
    the priority of the second client is based on the weight values associated with sections of the second plurality of shared area sections within a predefined range of the second cursor location.

43. The tangible computer program product of claim 40, comprising further instructions for performing steps comprising:
    displaying the first and second cursor positions at each of the first and second clients; and
    changing the manner in which at least one of the first cursor and the first boundary is displayed at the first client when the first cursor is within the region defined by the second boundary.

44. A tangible computer program product having stored thereon data representing sequences of instructions which, when executed by a processor, cause the processor to perform steps comprising:
    transmitting printed circuit board design data to each of first and second clients, Wherein
        the design data includes graphically displayable information regarding a pattern of electronic components and connections between those components for at least a portion of the design,
        the design data includes data corresponding to at least a portion of a shared area of the design, and
        the shared area is simultaneously editable by both of the clients;
    receiving data describing a first boundary associated with a part of the shared area being edited at the first client;
    transmitting the data describing the first boundary to the second client for display thereon as a collection of points separating one region of a graphical display of the pattern of electronic components and connections from another region of said graphically displayed pattern; and
    preventing the second client from editing parts of the shared area within the first boundary.

45. The tangible computer program product of claim 44, wherein said preventing the second client from editing comprises rejecting a request received from the second client to edit a portion of the shared area within the first boundary.

46. The tangible computer program product
    of claim 44, wherein the first boundary defines an area around a location of a first cursor, said first cursor being controlled at the first client.

47. The tangible computer program product of claim 46, comprising further instructions for performing steps comprising:
    receiving additional data describing a changed size of the first boundary based on editing activity within the shared area performed at the first client.

48. The tangible computer program product of claim 44, comprising further instructions for performing steps comprising:
    transmitting for display at the second client an identifier associating the first boundary with at least one of the first client and a user editing the shared area from the first client.

49. A tangible computer program product having stored theren data representing sequences of instruction which, when executed by a processor, cause the processor to preform steps comprising:
    transmitting printed circuit board design data at each of first and sedond client, wherein
        the design data includes graphically displayable information regarding a pattern of electronic components and connections between those components for at least a portion of the design,
        the design data inlcudes data corresponding to at least a portion of a shared area of the design, and
        the shared area is simultaneously editable by both of the clients;
    receiving data describing a first boundary associated with a part of the shared area being edited at the first client;
    transmitting the data describing the first boundary to the second client for display thereon;
    preventing the second client from editing parts of the shared area within the first boundary:
    associating each of a first plurality of sections of the shared area with a respective one of a first plurality of weight values; and changing weight values of the first plurality of weight values based on editing activity at the first client, said editing activity pertaining to the shared area sections associated with the changed weight values, and wherein a size of the first boundary is based on at least some of the weight values.

50. The tangible computer program product of claim 49, comprising further instructions for performing steps comprising:
changing individual weight values of the first plurality of weight values as a function of time.

51. The tangible computer program product of claim 49, wherein:
the first boundary defines a region around a location of a first cursor, the first cursor being controlled at the first client, and
the size of the first boundary is based on the weight values associated with sections of the first plurality of shared area sections within a predefined range of the first cursor location.

52. The tangible computer program product of claim 49, comprising further instructions for performing steps comprising:
associating each of a second plurality of sections of the shared area with a respective one of a second plurality of weight values;
changing weight values of the second plurality of weight values based on editing activity at the second client, said editing activity pertaining to the shared area sections associated with the changed weight values of the second plurality of weight values;
receiving data describing a second boundary associated with a part of the shared area being edited at the second client, wherein
the second boundary defines a region around a location of a second cursor, the second cursor being controlled at the second client, and
a size of the second boundary is based on the weight values associated with sections of the second plurality of shared area sections within a predefined range of the second cursor location;
transmitting the data describing the second boundary to the first client for display thereon; and
preventing the first client from editing parts of the shared area within the second boundary.

53. The tangible computer program product of claim 52, further comprising:
determining, prior to said step of preventing the first client from editing, a lower first client priority relative to a second client priority.

54. The tangible computer program product of claim 53, wherein:
the priority of the first client is based on the weight values associated with sections of the first plurality of shared area sections within a predefined range of the first cursor location, and
the priority of the second client is based on the weight values associated with sections of the second plurality of shared area sections within a predefined range of the second cursor location.

55. A tangible computer program product having stored thereon data representing sequences of instructions which, when executed by a processor, cause the processor to perform steps comprising:
displaying printed circuit board design data at a first client, wherein
the design data includes graphically displayable information regarding a pattern of electronic components and connections between those components for at least a portion of the design,
the design data includes data corresponding to at least a portion of a shared area of the design, and
the shared area is simultaneously editable by the first client and a second client;
generating a first boundary associated with a part of the shared area being edited at the first client, said first boundary defining a region of the shared area protected from editing by the second client, said first boundary displyable at the second client as a collection of points separating one region of a graphical display of the pattern of electronic components and conections from another region of said graphically displayed pattern; and
transmitting data regarding the first boundary for display at the second client.

56. The tangible computer program product of claim 55, comprising further instructions for performing steps comprising:
displaying at the first client a second boundary associated with a part of the shared area being edited at the second client, said second boundary defining a region of the shared area protected from editing by the first client.

57. The tangible computer program product of claim 56, comprising further instructions for performing steps comprising:
increasing a size of the first boundary based on editing activity at the first client;
transmitting data regarding the increased first boundary size for display at the second client; and
receiving data regarding an increased size of the second boundary, said increase in the second boundary size being based on editing activity at the second client.

58. A tangible computer program product having stored thereon data representing sequences of istructions which, when executedd by a processor, cause the processor to preform steps comprising:
displaying printed circuit board design data at a first client, wherein
the design data includes graphically displayable information regarding a pattern of electronic components and connections between those components for at least a portion of the design,
the design data includes data correpsonding to at least a portion of a shared area of the design, and
the shared area is simultaneously editable by the first client and a second client; generating a first boundary associated with a part of the shared area being ecited at the first client, said firs boundary defining a region of the shared area protected from editing by the second client;
transmitting data regarding the first boundary for display at the second client; and
displaying at the first cleint a second boundary asscoiated with a part of the shared area being edited at the second cleint, said second boundary defining a region of the shared area protected from editing by the first client, and wherein
the first boundary defines an area around a location of a first cursor, said first cursor being controlled at the first client, and
the second boundary defines an area around a location of a second cursor, said second cursor being controlled at the second client.

* * * * *

UNITED STATES PATENT AND TRADEMARK OFFICE
CERTIFICATE OF CORRECTION

PATENT NO. : 7,516,435 B2
APPLICATION NO. : 10/870497
DATED : April 7, 2009
INVENTOR(S) : Petunin et al.

It is certified that error appears in the above-identified patent and that said Letters Patent is hereby corrected as shown below:

On the Cover Page, Section (56) References Cited
    Please insert the following references:

--US PATENT DOCUMENTS
5,295,081   03/1994   Habra
5,339,388   08/1994   Bates, et al.
6,240,414   05/2001   Beizer, et al.
6,442,570   08/2002   Wu
6,983,232   01/2006   Nguyen, et al.
7,337,093   02/2008   Ramani, et al.
2008/0034342   02/2008   Pentunin, et al.
2008/0059932   03/2008   Pfeil, et al.

FOREIGN PATENT DOCUMENTS
EP   05-050370   07/1993
EP   05-058006   09/1993
JP   05-324360   07/1993

OTHER PUBLICATIONS
English Translation of April 15, 2008 Notice of Grounds for Rejection for JP2007-247641.

International Search Report and Written Opinion for PCT/US04/37183 dated May 9, 2008.

Konduri, et al. "A Framework for Collaborative Design and Distributed Web-Based Design", 1999, pages 898-903.

Konduri, et al. "Vela Project on Collaborative Distributed Design: New Client/Serve Implementations", May 6, 1999, pages 1-8.

Datasheet for "Allegro PCB Design 220"; by Cadence, March 9, 2004, 8 pages.

Saha, et al,. "Web-Based Distributed VLSI Design", MIT published January 4-7, 1998, pages 449-454.

UNITED STATES PATENT AND TRADEMARK OFFICE
CERTIFICATE OF CORRECTION

| | |
|---|---|
| PATENT NO. | : 7,516,435 B2 |
| APPLICATION NO. | : 10/870497 |
| DATED | : April 7, 2009 |
| INVENTOR(S) | : Petunin et al. |

It is certified that error appears in the above-identified patent and that said Letters Patent is hereby corrected as shown below:

"Vela Project – Globally Distributed Microsystem Design" by CBL, June 1998, 23 pages.

Copy of Google™ Search bearing date of April 28, 2008; provided by examiner of application 10/960,793.

English translation of March 8, 2006, submission by undisclosed third party in Japanese Patent Application 2003-551734 (2 pages).

English translation of March 8, 2006, submission by undisclosed third party in Japanese Patent Application 2003-551712 (2 pages).

English translation of March 29, 2007, submission by undisclosed third party in Japanese Patent Application 2003-551734 (7 pages).

English translation of September 29, 2006, submission by undisclosed third party in Japanese Patent Application 2003-551712 (15 pages).

English translation of October 25, 2007, submission by undisclosed third party in Japanese Patent Application 2003-551712 (4 pages).

English translation of April 4, 2007, submission by undisclosed third party in Japanese Patent Application 2003-551734.

English translation of October 25, 2007, submission by undisclosed third party in Japanese Patent Application 2003-551712.

March 14, 2008 Official Communication in European Patent Application 02 797 245 (6 pages).

March 25, 2008 Third Party Submission in European Patent Application 02 797 245, with attachments (44 pages).

Translation of January 8, 2008 Decision of Refusal in Japanese Patent Application 2003-551734 (3 pages).

UNITED STATES PATENT AND TRADEMARK OFFICE
CERTIFICATE OF CORRECTION

PATENT NO. : 7,516,435 B2
APPLICATION NO. : 10/870497
DATED : April 7, 2009
INVENTOR(S) : Petunin et al.

It is certified that error appears in the above-identified patent and that said Letters Patent is hereby corrected as shown below:

May 30, 2007 Office Action in European Patent Application 02 797 245 (6 pages).

Translation of May 29, 2007 Office Action in Japanese Patent Application 2003-551734 (3 pages).

International Preliminary Report on patentability for PCT/US2006/035374 dated March 18, 2008.

Supplementary European Search Report for EP 02 79 5797 dated July 3, 2007.

May 14, 2007 Letter supplementing the Search Report and the Supplementary Partial European Search Report dated October 20, 2006.

February 6, 2008 Office Action in EP 02 795 797.6 (3 pages).--

In Column 17, Claim 3, Line 34:
    Please delete "fUrther" and insert --further--

In Column 18, Claim 7, Line 4:
    Please delete "weight;" and insert --weight values;--

In Column 21, Claim 29, Line 30:
    Please delete "form edition" and insert --from editing--

In Column 21, Claim 29, Line 31:
    Please delete "associated with a part of the shared area" and insert --for display at the second client; and--

In Column 21, Claim 29, Line 34:
    Please delete "withe" and insert --with--

In Column 21, Claim 30, Line 56:
    Please delete "aportion" and insert --a portion--

In Column 21, Claim 30, Line 60:
    Please delete "area edited" and insert --area being edited--

UNITED STATES PATENT AND TRADEMARK OFFICE
CERTIFICATE OF CORRECTION

PATENT NO. : 7,516,435 B2
APPLICATION NO. : 10/870497
DATED : April 7, 2009
INVENTOR(S) : Petunin et al.

It is certified that error appears in the above-identified patent and that said Letters Patent is hereby corrected as shown below:

In Column 22, Claim 37, Line 39:
    Please delete "instruction" and insert --instructions--

In Column 22, Claim 37, Line 40:
    Please delete "preform" and insert --perform--

In Column 22, Claim 37, Line 43:
    Please delete "sedond client" and insert --second clients--

In Column 22, Claim 37, Line 62:
    Please delete "beig" and insert --being--

In Column 22, Claim 37, Line 63:
    Please delete "icluding" and insert --including--

In Column 22, Claim 37, Line 65:
    Please delete "displyig" and insert --displaying--

In Column 24, Claim 44, Line 6:
    Please delete "Wherein" and insert --wherein--

In Column 24, Claim 49, Line 46:
    Please delete "theren" and insert --thereon--

In Column 24, Claim 49, Line 46:
    Please delete "instruction" and insert --instructions--

In Column 24, Claim 49, Line 47:
    Please delete "preform" and insert --perform--

In Column 24, Claim 49, Line 50:
    Please delete "sedond client" and insert --second clients--

In Column 26, Claim 58, Line 36:
    Please delete "preform" and insert --perform--

UNITED STATES PATENT AND TRADEMARK OFFICE
CERTIFICATE OF CORRECTION

PATENT NO. : 7,516,435 B2
APPLICATION NO. : 10/870497
DATED : April 7, 2009
INVENTOR(S) : Petunin et al.

It is certified that error appears in the above-identified patent and that said Letters Patent is hereby corrected as shown below:

In Column 26, Claim 58, Line 48:
  Please delete "ecited" and insert --edited--

In Column 26, Claim 58, Line 49:
  Please delete "firs" and insert --first--

In Column 26, Claim 58, Line 54:
  Please delete "cleint" and insert --client--

Signed and Sealed this

Seventeenth Day of November, 2009

David J. Kappos
*Director of the United States Patent and Trademark Office*